March 8, 1966 J. L. BARKER 3,239,653

TRAFFIC DENSITY COMPUTER

Filed Sept. 8, 1960 7 Sheets-Sheet 1

INVENTOR.
JOHN L. BARKER
BY
Edward W. Eames
ATTORNEY

*INVENTOR.*
JOHN L. BARKER
*BY*
Edward W. Eames
ATTORNEY

INVENTOR.
JOHN L. BARKER
BY
Edward W. Eaves
ATTORNEY

March 8, 1966 J. L. BARKER 3,239,653

TRAFFIC DENSITY COMPUTER

Filed Sept. 8, 1960 7 Sheets-Sheet 4

INVENTOR.
JOHN L. BARKER

BY

Edward W. Eames

ATTORNEY

March 8, 1966 J. L. BARKER 3,239,653

TRAFFIC DENSITY COMPUTER

Filed Sept. 8, 1960 7 Sheets-Sheet 5

*INVENTOR.*
JOHN L. BARKER

*BY*

ATTORNEY

INVENTOR.
JOHN L. BARKER

BY

Edward W. Eames

ATTORNEY

INVENTOR.
JOHN L. BARKER
BY
Edward W. Eames
ATTORNEY

United States Patent Office 3,239,653

Patented Mar. 8, 1966

3,239,653

TRAFFIC DENSITY COMPUTER

John L. Barker, Norwalk, Conn., assignor, by mesne assignments, to Laboratory For Electronics, Inc., Boston, Mass., a corporation of Delaware Filed Sept. 8, 1960, Ser. No. 57,864
30 Claims. (Cl. 235—150.24)

This invention relates generally to computing devices, and more particularly to a device for computing the density of traffic moving along a roadway.

This application is a continuation in part of my copending U.S. application S.N. 816,966, filed on May 29, 1959, now abandoned.

There are three very important terms utilized in traffic engineering. One of these is the term "traffic density," and the present device is used to determine the traffic density which is the number of vehicles within a given space along a road. Traffic density therefore is a measurement of the number of vehicles occupying a unit length of roadway at a given instant, and is measured in vehicles per unit length of roadway, which is usually vehicles per mile.

A second term which is important in traffic engineering is "traffic volume," and this is defined as the number of vehicles passing a given point during a specified period of time and is usually measured in vehicles per hour.

The third important measurement is that of "traffic speed" which is the speed of vehicles flowing upon a roadway, usually measured in miles per hour.

Traffic density in vehicles per mile is one of the prime parameters in traffic engineering, and in most cases has significant value as a measurement. In the past, the measurement of traffic density has been made by a check-in and check-out system whereby the number of vehicles entering a space has been recorded and the number of vehicles leaving a space has been recorded in order to determine the number of vehicles within the space. Such check-in and check-out devices, as is well known, develop a cumulative error which rapidly produces large errors, rendering the measurement of no value.

The present invention employs a relationship that traffic volume is equal to the product of traffic density times speed, provided that these several parameters are placed on a common basis of measurement for essentially the same vehicles in the traffic. In accordance with one important aspect of the invention the density is determined by placing a volume computer and a speed computer on the same base and then dividing the output of the volume computer by the output of the speed computer.

One method of providing a true traffic density instrument is to utilize a volume computer so that it computes the volume of traffic over a given number of vehicles by means of a variable time base with a speed averaging computer averaging the same number of vehicles.

A second method is to modify a speed computer so that it averages over a number of vehicles corresponding to the number operating on a volume computer. Since a volume computer provides an average reading of vehicles per unit time, a speed averaging computer could then be provided with an input circuit which uses this volume information to adjust its averaging circuit such that it is computing averages on the same number as used in the volume computer.

In the control of traffic in a system of intersections, as well as in control or monitoring of normally free flowing traffic on roads, expressways, freeways, and the like, traffic density is a quantity which allows considerably better prediction of the behavior of the traffic than other traffic measurements. Thus, it has great advantage in determining the cycle length and off-sets of a traffic control system.

The invention herein disclosed has as its principal object the furnishing of a device for determining the density of traffic on a roadway by detection of presence of vehicles and measurement of speed of the vehicles.

Another object of this invention is to provide a device which determines the density of traffic on a roadway from traffic volume and speed measurements.

A further object of this invention is the provision of a device which enables the determination of the density of traffic on a roadway from independent traffic volume and speed measurements related to each other on a per-vehicle base.

It is a further object of this invention to provide a device or method for determining traffic density normally from traffic volume and speed measurement, except when the traffic speed is below a low preset threshold value, under which latter condition the measurement of density by volume and speed serves as a first potential measure of traffic density and the measurement of traffic speed alone is used inversely as a second potential measure of traffic density and the higher of the first and second potential measures of traffic density is used as a final measure of traffic density.

A still further object of this invention is to provide a device for dividing two variable quantities.

A traffic density computer embodying the invention and the manner of using the same is described herein with reference to the drawings in which:

FIG. 1 is a schematic view of the traffic density computer which is the subject of this invention;

FIG. 1*a* is a schematic view of the "OR" type circuitry associated with an amplifier in FIG. 1; and FIG. 2 is a diagrammatic showing of an alternate portion of circuitry utilized in the invention and shown in FIG. 1; and FIG. 3 is a diagrammatic showing of an alternate portion of the invention shown in FIG. 1.

Figure 1:
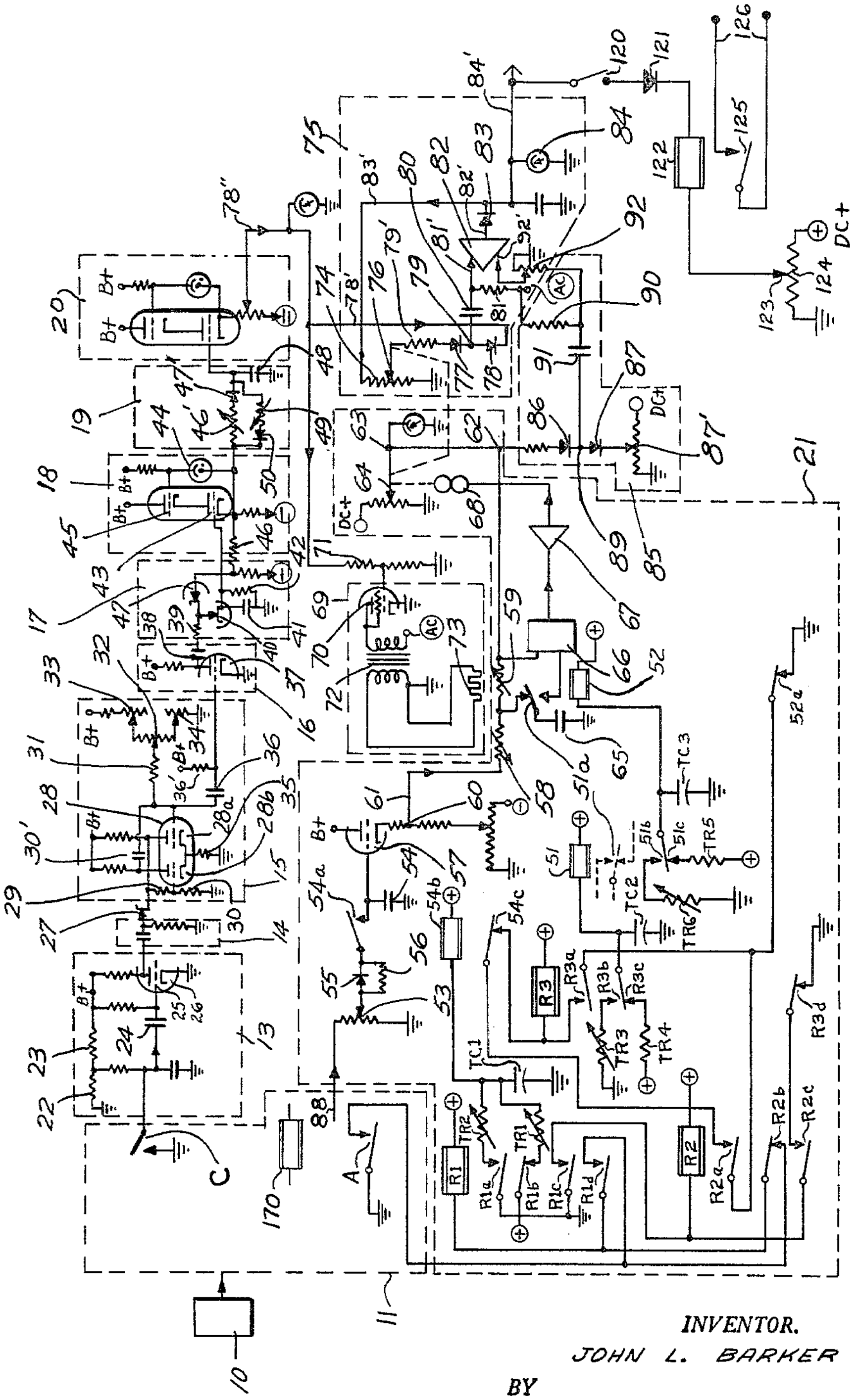

In FIG. 1 sensing element 10 is disposed adjacent to or over the roadway. Sensing element 10 is indicated as a radar detector or radar sensing unit, but can be of another type sensing element. Sensing unit 10 is of the type shown in my copending application, Serial No. 732,248 filed May 1, 1958, particularly described as RADAR SENSING UNIT RS1, and provides a voltage output each time a vehicle is sensed by it. The voltage output of sensing element 10 is a Doppler output which is very low frequency when the vehicle is adjacent to it and approaches its true speed as the vehicle recedes away from the sensing unit.

The said co-pending application S.N. 732,248 was issued October 16, 1962 as U.S. Patent 3,059,232.

The Doppler beat note is fed into speed and impulse translator 11 of the type shown in my copending application, Serial No. 732,248 filed May 1, 1958, particularly described as SPEED AND VOLUME IMPULSE TRANSLATOR, which utilizes the low frequency voltage component when the vehicle is adjacent to the sensing unit and closes relay contacts A and C of relay 170. The closing of the relay contact is registered in the volume computer which is indicated generally by the boxes numbered 13 through 20. The volume computer may be of the type shown in my copending application Serial No. 732,248 filed May 1, 1958, particularly described as VOLUME COMPUTER or may be of the type incorporated in blocks 13 to 20, shown in FIG. 1, which is a somewhat simplified form of volume computer from that shown in my said copending application. The volume computer illustrated in FIG. 1 is an example of a volume computer which may be used in the density computer which is the subject of the present application.

The relatively high frequency Doppler voltage which is an output of the speed and impulse translater is fed via lead 88 to the speed computer which is shown generally in block 21. The speed computer may be of the type shown in my co-pending application Serial No. 732,248 filed May 1, 1958, and particularly described as SPEED AVERAGING COMPUTER or may be of the type illustrated in block 21 which is a somewhat simplified form from that shown in my said copending appliaction. The speed average computer illustrated in FIG. 1 is an example of a speed average computer which may be used in the density computer.

It may be desired to employ a speed averaging computer such as described in my said copending application for example. It may then be necessary to modify the circuit somewhat so as to accord operation of the speed averaging computer on the same base as the volume computer, the base being determined by the volume computer. As more fully described below, the block 69, in FIG. 1 of the present application is employed to coordinate the base operation of the speed average computer with the volume computer, with block 69 controlled by the volume computer.

Thus the resistance in the speed averaging computer of my said copending application for example, that corresponds to the resistance 59 in the block 21 of FIG. 1 of the present application, may be controlled by, for example, a heating element, as for example 73 in block 69, to place the volume computer and the speed averging computer on the same base.

The speed and impulse translator provides an output pulse when a vehicle is sensed and a direct current (D.C.) output voltage which is linearly proportional to the speed of the sensed vehicle. The output pulses generally are applied to a volume computer whose output in turn is a voltage which is proportional to the rate of the pulses and calibrated in vehicles per hour, for example, although the actual measurement may be made on a shorter period of time such as one to three minutes, for example. The speed D.C. signal from the speed and impulse translator for each vehicle is applied to the speed computer and an average speed for a selected number of vehicles is determined; the selected number of vehicles being automatically adjusted to conform with the number of vehicles per unit of measuring period as indicated by the output of the volume computer. The output of the speed average computer is a D.C. voltage proportionate to the average speed of vehicles in the sample used by the volume computer to determine volume.

The detector relay contact C has across its contact when it is normally open a small D.C. voltage which is secured from potential divider 22–23 from B+ down to ground. The voltage may be about 15 volts for example, and when contact C is closed the voltage becomes zero. That change in voltage may be a negative 15 volts for example, which will be passed through capacitor 24 and grid 25 of vacuum tube 26. The negative pulse places a negative pulse on the grid of that tube. Tube 26 is normally conducting since its grid was held with a + bias on it. When the negative pulse is applied, the plate of tube 26 becomes positive and a very sharp and large plus pulse is obtained. Each time the detectors contacts come together a positive pulse is applied to differentiating circuit 14, such that the front edge of the square wave is just left as a positive spike. Diode 27 allows one-shot multivibrator 28 which received the output of block 14 to restore itself and not be influenced by the preceding circuitry. It is an isolation diode. Diode 27 passes the plus pulse to the plate of tube **28*a* of the multivibrator. This places a plus pulse on the grid of tube 28*b* through potential divider 29–30. When not receiving such a signal tube 28*b* was non-conducting and tube 28*a* conducting, and when the plus pulse is received tube 28*b* becomes conducting and tube 29*a* becomes non-conducting. It stays in that condition for a period dependent upon capacitor 30′ and resistor 31 and of course the voltage on the arm of potentiometer 32. The unit period of time can be varied by varying the potential setting of potentiometer 32**. In other words, a long duration or a short duration pulse can be obtained depending upon the potential setting.

For the volume computer to operate full scale for a small number of vehicles per hour, the length of time multivibrator 28 is on is relatively long, and just a few shots will give a full scale deflection. To set it for a large number of vehicles per hour would mean that each vehicle's pulse width would be small. The potentiometer 32 is fed by two other potentiometers 33 and 34 to provide means of calibrating or setting the limits of the range of adjustment of potentiometer 32. Resistor 35 allows for common cathode coupling and gives the multivibrator sharpness in transfer. The left hand section of the multivibrator is non-conducting normally and when it becomes conducting, a large negative change occurs in the anode voltage of tube **28*b* so that there is a large negative change occurs in the anode voltage of negative pulse on capacitor 36 which feeds the grid of tube 37. Resistor 36′ in the grid circuit of tube 37 holds tube 37** normally conducting.

The tube 37 is used to provide power and obtain a squarer output. When the input of tube 37 is negative the tube is completely cut off and the anode goes essentially to B+ voltage. When it is conducting it goes essentially to ground.

Block 17 contains a counter circuit. Capacitor 38 is used as a coupling capacitor. When the plate of tube 37 goes positive, the voltage on the left hand side of resistor 39 goes positive at exactly the same time because of the coupling capacitor, and that voltage in combination with resistor 39 and the length of time of the pulse as determined by the multivibrator determines the amount of current that will flow through diode 40 that then is connected to capacitor 41.

Therefore each time a detector pulse is received a charge is placed in capacitor 41 which is a unit charge. The amount of charge is determined by the length of time the multivibrator retained its conducting condition. For any given setting the amount of charge given capacitor 41 per detected car is constant. Capacitor 41 then actually receives pulses corresponding to each vehicle detected. This tends to build up the charge in the capacitor. Resistor 42 connected in parallel with capacitor 41 bleeds off charges in the capacitor. This results in two effects working against each other. One, an attempt to put charges in by these increments of current, and the other is the resistor trying to bleed the charge out. This provides for a true rate circuit if the charges that are put in the capacitor each time are the same size. The voltage across capacitor 41 is then a measure of the volume or the rate at which the vehicles are actuating the detector.

The voltage in capacitor 41 is placed on the grid of tube 43 which is used as a cathode follower. The cathode of tube 43 is going to do essentially what the grid does and the voltage tube 44 transfers any voltage change in the cathode of tube 43 to the grid of tube 45 as a D.C. voltage change, so that if the cathode of tube 43 goes +20 volts for example the grid of tube 45 goes +20 volts. The anode to cathode voltage of tube 43 is therefore essentially constant which makes it a much more linear device than just a simple cathode follower. The cathode voltage is also fed back from tube 43 via resistor 46 and diode 47. The reason for this is that as the instantaneous charge in capacitor 41 goes up, unit charges could not be put into it each time, unless something was done to compensate for increases in voltage on the storage capacitor. The voltage in storage capacitor 41 is actually an instantaneous volume measurement. The voltage is fed back via resistor 46 and diode 47 so that if the cathode of tube 43 goes positive, that positive voltage places an additional plus voltage on capacitor 38, so that the charging voltage is not dependent upon the voltage on the storage capacitor.

The minus in a circle in blocks 17, 18 and 20 represents a negative D.C. voltage somewhat below ground.

The output voltage or cathode voltage of tube 43 is of the instantaneous volume. This output is applied to resistor 46′ and diode 47′ which feed capacitor 48. Resistor 46′ in combination with capacitor 48 smooths the instantaneous voltage. The reason that resistor 49 and diode 50 are used is that under certain conditions of operation the voltage at the cathode of tube 43 is higher than the voltage of capacitor 48, and under other conditions of operation the cathode voltage of tube 43 is lower than the voltage on the capacitor.

The output of capacitor 48 feeds directly into another cathode follower combination that is shown in block 20. The circuitry in block 20 provides power amplication so that work circuits can be driven.

Also coming out of the speed and impulse translator 11 via lead 88 is a voltage which is proportionate to the speed of the vehicle.

The impulses coming out of the speed and impulse translator each time a vehicle is detected initiate a sequence of operation of timing circuits which control sequential operation of several relays.

Upon operation of relay 170, shown deenergized in the speed and impulse translator, contacts A and C close. Upon closure of contact A deenergized relay R1 is energized through normally closed contact R2*b* of deenergized relay R2. Relay R1 locks in through its contact R1*d* and contact A. Closure of normally open contact R1*c* completes a pull in circuit for relay R2. Relay R2 locks in through its normally open contact R2*c* and normally closed contact R3*d* of deenergized relay R3. Operation of relay R1 closes normally open contact R1*a* and opens normally closed contact R1*b*. While contact R1*b* was closed and contact R1*a* was open a timing capacitor TC1 was fully charged through high adjustable resistance TR1 from a D.C. supply. When contact R1*a* closes and contact R1*b* opens the charge on capacitor TC1 begins to bleed off through low adjustable resistance TR2 to ground. As soon as the charge on TC1 is slightly reduced relay 54*b*, a very sensitive relay, is operated thus closing its normally open contact 54*a*. Closure of contact 54*a* provides a circuit to charge capacitor 54 by the increasing input speed voltage from the speed and impulse translator 11.

The length of time relay 170 is operated is dependent upon, and inversely proportional to, the speed of the vehicle detected and this time is employed to hold relay R1 operated to effect controlled discharge of the capacitor TC1. Upon release of contact A by relay 170 relay R1 becomes deenergized and its contact R1*a* is opened to stop the controlled discharge of capacitor TC1 and its contact R1*b* is closed to begin recharging the capacitor and thus time a delayed fall out of relay 54*b* from the opening of contact A. Thus delayed fall out of relay 54*b* is timed by the controlled charging of capacitor TC1 which relay falls out upon capacitor TC1 approaching a full charge condition.

When relay 54*b* becomes deenergized contact 54*c* is released and returns to its normally closed condition and contact 54*a* opens cutting off the charging of capacitor 54 via lead 88. The relay R3 is a delayed-on-pull-in relay to prevent its being energized while the relay 54b awaits the small discharge of capacitor TC1. This ensures energization of relay R3 will sequentially occur after deenergization of relay 54*b*. Relay R3 pulls in through contact 54*c* of relay 54*b* and contact R2*a* and normally closed contact 52*a* of deenergized relay 52.

With relay R3 operated its now open contact 53*d* breaks the holding circuit for relay R2 and relay R2 drops out. Closure of normally open contact R3*b* and the opening of normally closed contact R3*c* initiates a timing circuit by discharging timing capacitor TC2 through adjustable resistance TR3, the capacitor having been charged through resistance TR4 and contact R3*c*. When the charge on TC2 becomes sufficiently reduced relay 51 will operate. Operation of relay 51 reverses the position of contact 51*a* and closes contact 51*b* and opens contact 51*c* thus initiating a timing circuit which delays the pull in of relay 52. Contact 51*a* is shown in phantom form beneath relay 51. Contact 51*c*, when normally closed (with relay 51 not operated), permits the timing capacitor TC3 to be charged through resistance TR5, but when relay 51 is operated, contact 51*c*, opens and contact 51*b* closes to allow the charge on TC3 to bleed off through adjustable resistance TR6.

When the charge on TC3 is sufficiently reduced, the relay 52 is operated and opens contact 52*a*.

Open contact 52*a* causes relay R3 to drop out which relay opens contact R3*b* to cause relay 51 to drop out which turn opens contact 51*b* and causes relay 52 to drop out.

Thus the sequence of operation of the several relays is achieved.

The reason for the sequence of delayed relay operation is that as a vehicle is adjacent to the detector the relay 170 operates. Now, to read its speed a delay must be effected. To provide that the speed of the vehicle will be taken at a constant distance beyond the detector, the length of the pulse energizing relay 170 which is inversely proportional to the speed of the vehicle detected, is used to adjust the delay-in-fall out of relay 54*b* which relay when deenergized effects the opening of contact 54*a*. Thus after the vehicle is positioned for reading of its speed the effected delayed fall out of relay 54*b* causes the relay to become deenergized and the voltage then on capacitor 54, having been fed via lead 88, potentiometer 53, diode 55 and closed contact 54*a*, will correspond to the vehicle's speed.

The speed reading is applied to a circuit that will determine a new average by comparing the last car speed on lead 61 with the old average speed at point 62 and put the new average into some storage device, and then connect the storage device with the new average on it to a servo mechanism to drive the old average up to the new desired average.

The increasing input speed voltage is applied from the speed and impulse translator via lead 88, calibrating potentiometer 53 and contact 54*a* so that the voltage stored in condenser 54 will correspond to the true speed of the vehicle. Contact 54*a* remains closed for a period and upon opening, leaves a voltage on capacitor 54 corresponding to the speed of the vehicle that has just passed. Diode 55 and resistor 56 are between the input and capacitor 54. If the vehicle sensed is a very long vehicle, the speed reading will tend to increase as the cab of the vehicle goes by. As the rest of the vehicle is sensed a low frequency signal again appears which would reduce the speed reading. To provide a peak reading without reduction of speed the diode prevents the voltage from rapidly falling thus insuring a true speed reading on capacitor 54. Another reason for use of the diode is that in any radar device there is present multiple transmissions whereby signals are lost for an instant of time. This is due to reflection from one path to the other giving phase cancellation. The diode allows the capacitor to charge to its maximum value and even though there is a momentary loss of signal, it still maintains the maximum speed.

The last car speed which is now stored on the last car speed storage capacitor 54 is passed through cathode follower 57 to obtain power to operate. This voltage is essentially the voltage that is on the last car speed storage capacitor 54 and the object then is to apply a portion of that voltage difference from the previous average speed to a storage device as a new average speed. Resistors 58 and 59 are arranged in series and connected between point 60 which is a voltage indicating the speed of the last car and point 62 which indicates by the mechanical position of arm 64, a voltage corresponding to the speed average. Contact **51*a* is connected with capacitor 65 so that during the interval that the last car speed is being recorded and after contact 54*a* opens, the voltage on the capacitor is being adjusted to a new average speed as shown in FIG. 1 with relay 51 deenergized. When relay 51** is pulled in (i.e., operated) by delay timing action following closure of contact R3*b* of relay R3 as above described, relay 51 reverses contact **51*a* thereby connecting the new average speed to one input of chopper 66 and servo amplifier 67. The other input to the chopper is the previous average appearing at 62. The chopper simply alternately connects between those two inputs, and if there is a difference between the two inputs, then an A.C. wave is received on the output. If there is no difference, it makes no difference which signal is connected to the output which feeds the servo-amplifier. The output of the chopper is an A.C. voltage which is proportionate to the difference between the new average and the old average, and it is phased such that after it is amplified, it will drive servo motor 68** in the proper direction. The other phase connection of the servo motor is not shown, but it is connected to 60 cycle power, for example. If the new voltage is higher than the old voltage the motor will drive clockwise, and if it is lower, it will drive counterclockwise.

The servo amplifier drives the servo motor which in turn drives the potentiometer arm 64 so as to make the average voltage appearing at 62 equal to the new voltage appearing at **51*a***.

The purpose of the circuit shown in block 69 is to place the average speed indication and the volume indication on the same base, in other words, corresponding essentially to the same group of vehicles. Assume that the volume computer has been measuring a rate in vehicles per hour for a given time base, then the output of the volume computer indicates how many vehicles were detected in that time period. The speed averaging computer must then be adjusted so that its average is based on the same number of vehicles as indicated by the output of the volume computer. This is accomplished by changing the ratio of resistor 59 over resistor 58 plus resistor 59 in block 21. We must therefore adjust the value of resistor 59 in order to change this ratio. This is done by taking the D.C. voltage output from the volume computer and applying it to the grid of tube 70 through divider 71. Tube 70 amplifies the signal and applies it to the primary of transformer 72 which has the other side of the primary connected to an A.C. (alternating current) source. Therefore, the amount of A.C. voltage in that transformer primary is dependent upon how positive the grid voltage is on tube 70. The secondary of the transformer feeds heating element 73 associated with resistor 59 which in this case is actually a thermistor (as is resistor 58). The net result is that as the heat in heater 73 increases corresponding to a volume increase, thermistor 59 will have its resistance lowered because of the higher temperature. If the unit is operating—as an example—at a low volume, there will be low heat in the heat element, therefore thermistor 59 will have a relatively high value of resistance, and the ratio of resistance 59 over resistance 58 plus resistance 59 will be a fraction having a relatively high value indicating that a low number of vehicles should produce the average. If the volume is high, the heater element will have a high power which will make the resistance of thermistor 59 low indicating that the ratio will be very small, and therefore the number of cars to produce a new average will be large.

To obtain the density it is now necessary to divide one voltage quantity by the other since the two quantities of volume in vehicles per hour and speed in miles per hour are available and density is measured in vehicles per mile.

Volume must be divided by speed to obtain density. In order to do this a value of density is assumed and multiplied by speed and the result compared with the measured value of volume. The error is used to adjust the assumed value of density until the error is reduced to a minimum and the value of density read.

Potentiometer 74 is shown in block 75 and the voltage on the potentiometer represents the assumed density. The arm 64 in block 21 corresponding to the speed is mechanically coupled to arm 76 of potentiometer 74. Therefore the density voltage is fully across potentiometer 74 and the speed is a function of the position of arm 76. The volume voltage resulting from the assumed density appears on the arm 76.

Diodes 77 and 78 are connected in series, and one end of those diodes returns to the output volume via lead 78′ from block 20. The other end of the diode combination is connected to arm 76 through limiting resistor 79′. If the computer volume at the output of block 20 is lower than the trial volume appearing on arm 76, current will flow through diodes 77 and 78, and the impedance of the junction of the two diodes will be relatively low. If the trial volume is lower than the computed volume there will be no current flowing through the diodes, and therefore the junction of the diodes can be assumed to be a high impedance point. The junction is indicated by the numeral 79 and coupled through capacitor 80 and resistor 81 to a source of A.C. voltage. If the junction 79 is at a high impedance indicating that the trial volume is lower than the computed volume, the voltage at the point of the junction will follow the A.C. voltage applied to resistor 81. That being the case, that same A.C. voltage will be applied to the input of amplifier 82.

Now where there is current flowing between the junction of the diodes as when the trial voltage is higher than the computed voltage, the A.C. that is applied to resistor 81 and also the input to the amplifier will all be absorbed. Therefore, if the impedance of the junction is low, there is no input to the amplifier or a very small input to the amplifier, and therefore there will be no A.C. on the output of the amplifier. If the impedance of the junction is high, the output of the amplifier will be high.

If the trial volume appearing at 76 is lower than the computed volume, the output of the amplifier 82 will be high and through diode rectifier 83 via lead 83′ will be applied to the upper side of potentiometer 74 and will raise the assumed value of the density appearing across potentiometer 74. If the output of the amplifier is high, then the input signal to the amplifier is lowered because the trial volume would have been high, causing the impedance at the junction of the diodes to be low, and therefore a low input signal to amplifier 82 which reduces the assumed density voltage.

The gain of amplifier 82 is very high so that the error is always insignificant, even though the values change a factor of ten to one. For example, if the gain is 100,000 in the amplifier, the error would be 0.001 to one percent in the density that is being computed. If the gain is 10,000, the error would be 0.01 to one percent. As an example, assume that the volume computed remains the same and the speed changes. Under those conditions, assuming the speed goes down, then the factor of density times speed will be lowered and the trial volume will go down causing the diodes to not conduct. The junction 79 now becomes a high impedance point and it is necessary then to raise the density. In other words, this high impedance point allows more signal input into the amplifier 82 which raises the density and raises then the trial volume, and that—in turn—occurs until the trial volume again is close to the computed volume. The new density is higher because the speed is lower and the volume is the same value.

Now the converse of that will be true if the speed increased. A trial volume would be present which was higher than the computed volume and the input to the amplifier would be lowered which in turn would reduce its output. The density and the input to the potentiometer 74 would be lowered and the voltage on arm 76 will go down and the trial volume again will go down until it is only slightly less than the computed volume and the condition of equilibrium has been achieved.

To summarize, in either case whether the potentiometer arm 76 is moved by change in speed or the voltage applied by the output of block 20 changes because of a change in actual measured volume, the substantial matching by the operation of the circuitry in block 75 of the trial volume and the computed volume results in having a value of density on 74 which then can be taken as the density for that combination and is then read on meter 84.

The voltage value appearing at 84' can of course be connected to a meter as shown, or connected to other circuitry as desired. In this case it can be connected to the input of an amplifier to do work. It could be used—for example—to drive work circuits associated with the determination of the cycle length on a traffic signal system. The density could be determined in one direction on a roadway and in another direction on the roadway by means of two density computers and a determination made as to which way the traffic should be favored by control of the "offset" of the traffic control system.

My U.S. Patent 2,542,978, issued February 27, 1951, for "Traffic Actuated Control Apparatus" illustrates a system of offset control employing measurement of traffic in opposite directions along a road for example.

If it is desired to provide an output in response to the density exceeding some predetermined value, the switch 120 can be closed to apply the density proportional output voltage from line 84' via switch 120 and diode 121 and the coil of relay 122 to tap 123 on potentiometer 124, which is connected across a direct current voltage corresponding to the voltage on line 84' for 100% density.

Adjusting potentiometer 123–124 determines the percentage of full density above which the diode 121 will become conducting and the relay 122 will be energized to close its contacts 125 to actuate an output circuit 126 for control of an alarm or other external device not shown, for example.

The relay is preferably of a relatively high impedance type to avoid excessive loading of the output of amplifier 82, although it will be appreciated that any moderate loading will merely increase somewhat the small voltage differential between the trial volume from potentiometer arm 76 and the computed volume from line 78', this differential remaining small compared to these volume signals for any setting of potentiometer 123–124 at any considerable percentage of the full scale density.

Several such adjustable response relay circuits may be added in parallel if desired to provide different outputs at several levels of density.

The purpose of block 85 is to provide a second computation of density under those condition in which the computation by division of volume by speed breaks down. Degeneration of the volume divided by speed computation occurs at extremely low volume and speed where it is impractical to determine accurately the division of a very small volume by a very small speed, and such degeneration also occurs under a completely stagnant traffic condition where no impulses will be received from the traffic. From experience it is known that at very low speeds a congested condition may be assumed and that the density will in general bear an inverse relationship, with respect to speed up to some maximum finite value of density. Therefore at values of speed below a certain value, the inverse speed alone can be used as a first approximation of the density.

Junction 62 in block 21 is connected through diodes 86 and 87 to the arm of potentiometer 87', which potentiometer is connected across a D.C. positive voltage with respect to ground, which is comparable to or a substantial part of the positive D.C. voltage with respect to ground across the potentiometer having arm 64 in block 21. The arm of the potentiometer 97' is set to some speed value below which the true density may not be computed correctly from the volume. If the voltage output of the speed computer is lower than the setting on the potentiometer, the junction of diodes 86 and 87 will be a high impedance point indicated as 89. If A.C. is applied at this point through resistor 90 and capacitor 91 there will be A.C. on resistor 92 also feeding amplifier 82, and of a magnitude proportional to the difference between the setting of potentiometer 87' and the speed output voltage from speed computer block 21. If the speed computer output voltage is higher than the setting of potentiometer 87' there will be no A.C. voltage on input resistance 92.

Amplifier 82 is designed so that two voltage inputs, one via capacitor 80, the other via capacitor 91, are applied to its input. These voltages have the same A.C. phase and the input circuit is such, in the amplifier, to select and amplify only the signal having the larger value. The output of the amplifier provides the voltage corresponding to the density measurement.

By use of potentiometer 92, any portion of the signal that is generated in the circuit shown in block 85 can be applied to the input of amplifier 82.

Figure 1A:
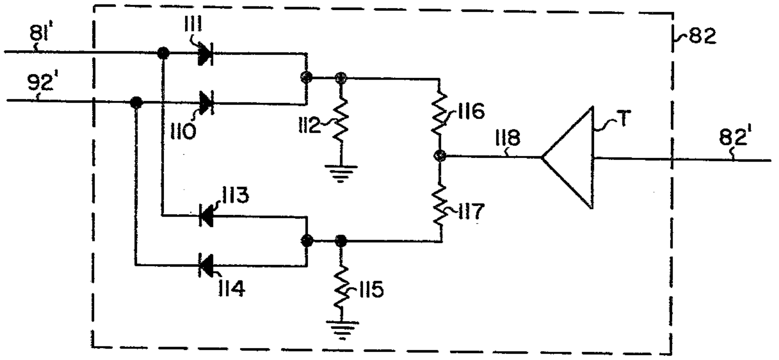

FIG. 1*a* shows the input circuitry details of the amplifier 82 of block 75. The large broken line block 82 in FIG. 1*a* corresponds to amplifier 82 of block 75, showing the two inputs 81' and 92' and the single output 82'. The two input lines 81' and 92' feed into "OR" type circuitry arranged to provide to a conventional single channel amplifier T a signal proportional to whichever of the signals on such two input lines is the larger.

This "OR" type circuitry includes the similarly poled diodes 110 and 111 connecting the respective lines 92' and 81' to resistor 112, the other lower side of which resistor is connected to ground, thus providing a voltage signal across resistor 112 for positive excursions of the larger of the two alternating input signals on lines 81' and 92' with respect to ground, these alternating signals being in phase.

Similarly, the diodes 113 and 114 are poled in the same direction with respect to each other but in opposite direction with respect to diodes 110, 111, so that diodes 113 and 114 provide a voltage signal on resistor 115 for the larger of the two inputs on the negative excursions of the alternating input signals.

The upper ends of the two resistors 112 and 115 are connected via equal resistors 116 and 117 in series, to provide at the junction between these latter resistors, at line 118, a resulting single channel input to amplifier T corresponding to the larger of the two original input signals from lines 81′ and 92′.

Figure 2:
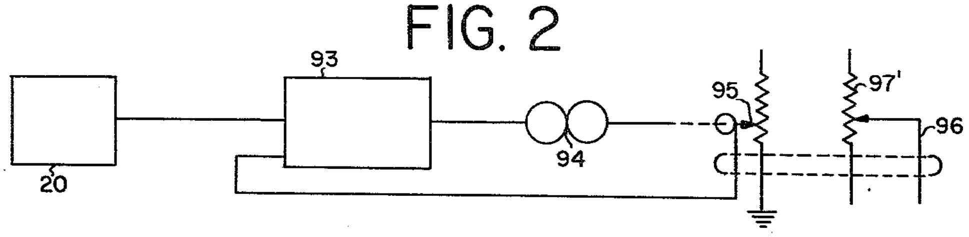

There are a number of ways for accomplishing that which is accomplished by the circuitry in block 69. One is shown in FIG. 2 where the computer volume output from block 20 is applied to servo amplifier 93 and motor 94 which places potentiometer arm 95 at an angular position corresponding to a given volume. A second arm 96 of that potentiometer adjusts resistor 97′ to a value proportionate to the position of the shaft and that part of resistor 97′ below arm 96 as would be resistor 59 of block 21, in this alternate construction.

Figure 3:
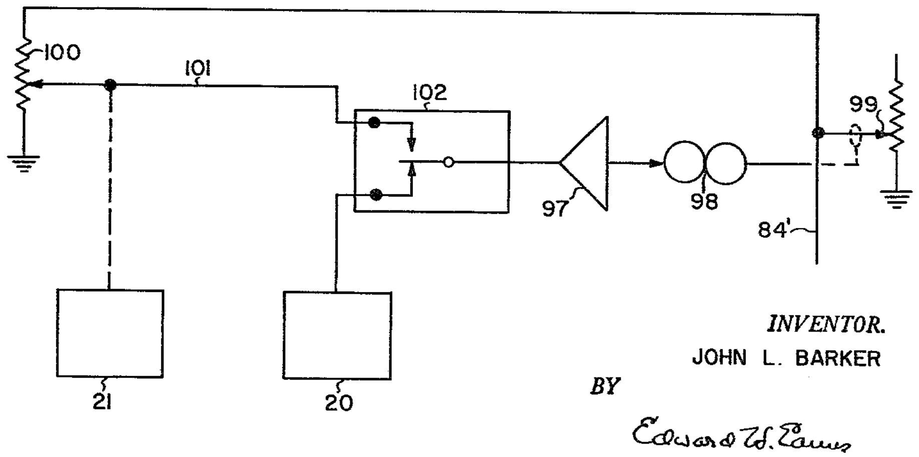

Also, FIG. 3 shows an alternate means of division; servo amplifier 97 and motor 98 drive potentiometer arm 99 to a voltage equal to density. This voltage is applied to multiplication potentiometer 100 so that the voltage across the full potentiometer is the value of the density. The arm connected to lead 101 of potentiometer 100 has its displacement proportionate to speed since it is mechanically linked to block 21 in FIG. 1. Therefore the voltage on arm lead 101 is equal to the volume. This volume is compared with the volume as measured by the volume computer in block 20 of FIG.1, the two volumes being placed into a chopper 102, and if they are not equal, servo amplifier 97 will be driven which will then drive the density servo potentiometer 99 on the right hand side to a value which will make the trial volume equal to the computer volume and therefore the density output is the true value of density.

It will be noted that in the form of circuitry shown in block 19 in FIG. 1, the oppositely poled diode-resistance circuits 47′–46′ and 50–49 provide means for separately adjusting the rate of response of the volume output of block 20 on line 78″ to the instantaneous volume output of block 18, depending on whether the output of block 18 is greater than or less than the output of block 19, the time constant of the RC circuit 42–41 of block 17 in such case being relatively short compared to the time constant of the RC circuit of 46′–48 or 49–48 in block 19. This separate adjustment serves to provide faster response with increasing volume or decreasing volume as desired, as indicated by the instantaneous volume being greater than or less than the longer time constant volume respectively.

If it is desired to have the density output respond to increasing density more rapidly than decreasing density, the circuitry can be modified to accomplish this.

Figure 4:
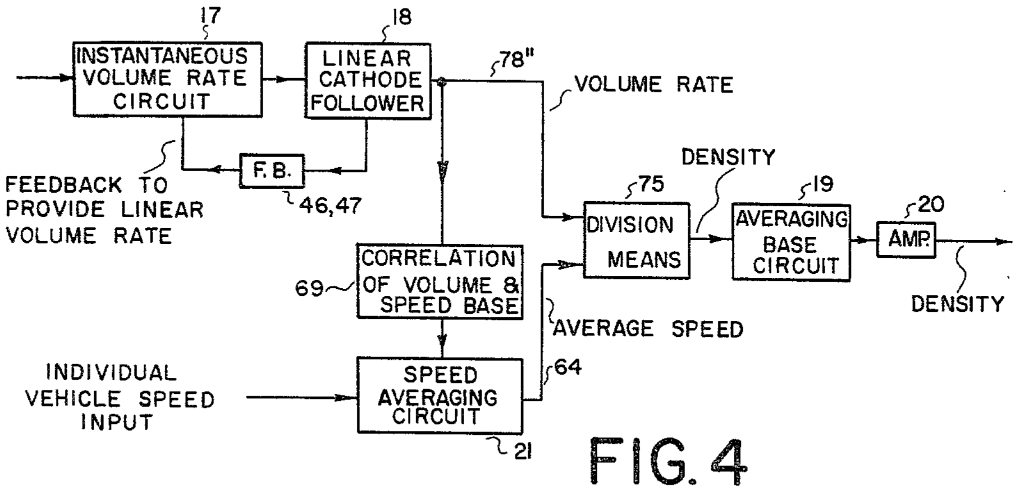
FIG. 4 illustrates in block diagram form that the time base circuit of FIG. 1 may be placed at the density output rather than the volume output.

This may be done as shown in FIG. 4 by transferring the circuit of blocks 19 and 20 to a position where block 19 will be fed by the output of block 75 and by connecting the output of block 18 to line 78″ instead of to block 19, so that the volume output on line 78″ will be the same for increasing and decreasing volume, but the density output can then be biased to respond more rapidly to decreasing or increasing density, as desired. In this variation the resistance 42 could be made adjustable and the final output of density would be taken from the output of the newly placed block 20.

Figure 5:
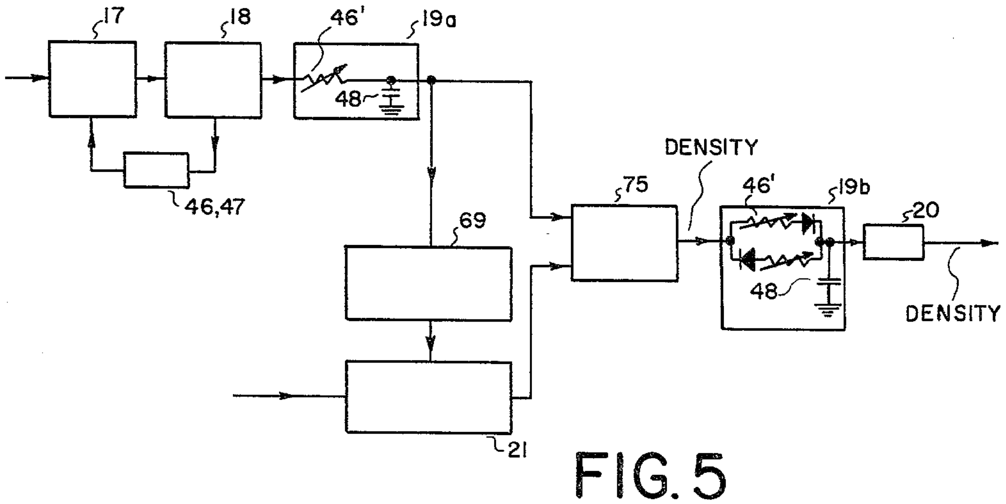
FIG. 5 illustrates partly in block and partly in schematic form that FIG. 1 may be modified to provide a time base in the volume computer with a single resistor and provide an up-down time base at the density output.

Another alternative as shown in FIG. 5 would be to leave the present blocks 19 and 20 in the position shown except to replace the dual resistor-diode combination 46′, 47′, 49, 50 in block 19 with a single adjustable resistance, and to add to the output of block 75 another set of blocks 19 and 20, with the dual resistor diode combination retained, to provide such separately adjustable response for increasing and decreasing density, while having the same rate of response of the volume output for increasing volume as for decreasing volume.

It should be understood that the present invention provides apparatus for determining the density of traffic in or traveling in one lane of a roadway and as described above detects passing vehicles passing by or under the detector or sensing unit. If it is desired to determine traffic density in two or more lanes of traffic on a multi-lane roadway a full set of the apparatus here proposed must be employed for each lane in which it is desired to compute the density of the traffic. The individual traffic densities could then be averaged if desired to determine the average density of a multi-lane facility.

Figure 6:
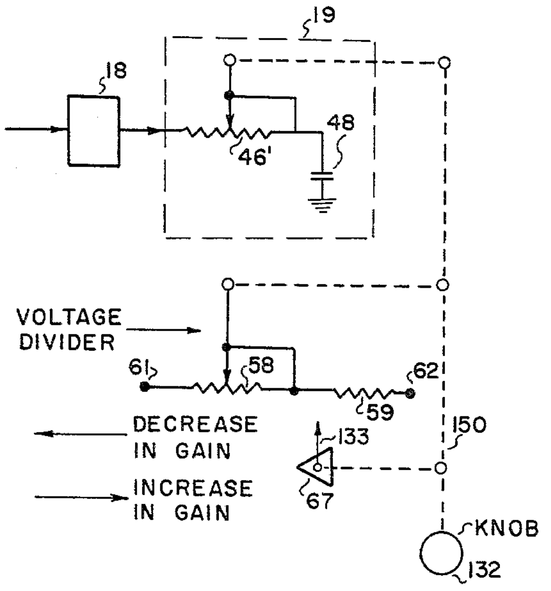
FIG. 6 illustrates additional cooperation between the elements of FIG. 1 so that variation of the time base also varies the ratio of the voltage divider circuit and the gain of the servo amplifier by a common mechanical linkage.
Figure 10:
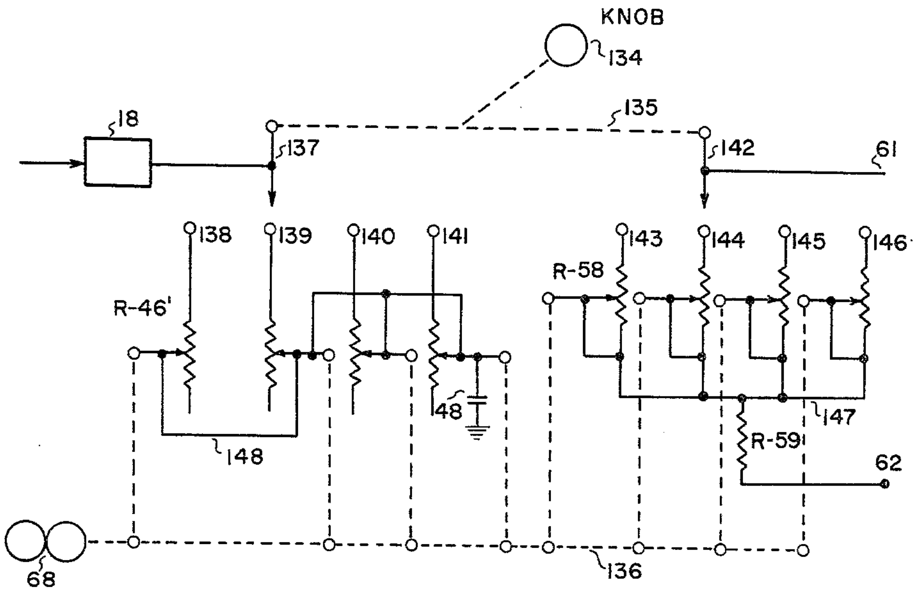
FIG. 10 illustrates a modification of FIGS. 7–9.
Figure 7:
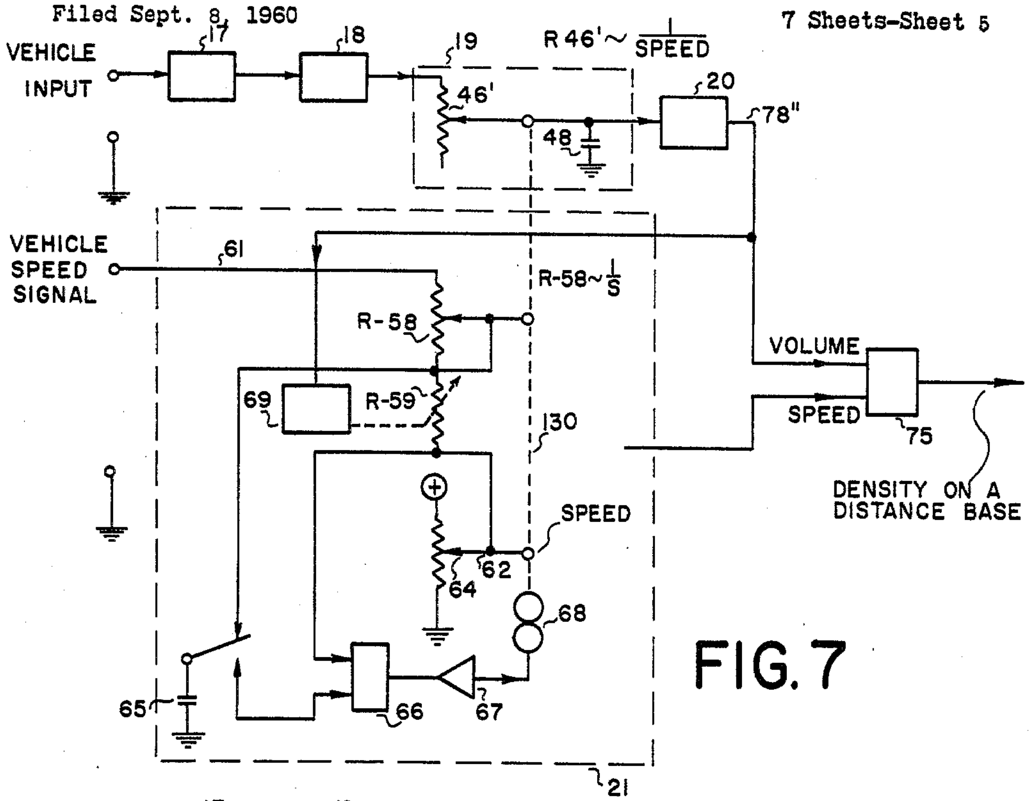
FIG. 7 illustrates partly in block form and partly in schematic form another embodiment of the invention in which traffic density is measured over a constant distance base by varying the time base of the volume computer and one of the thermistors of the divider circuit inversely with the average speed of the vehicles within the constant distance base.
Figure 8:
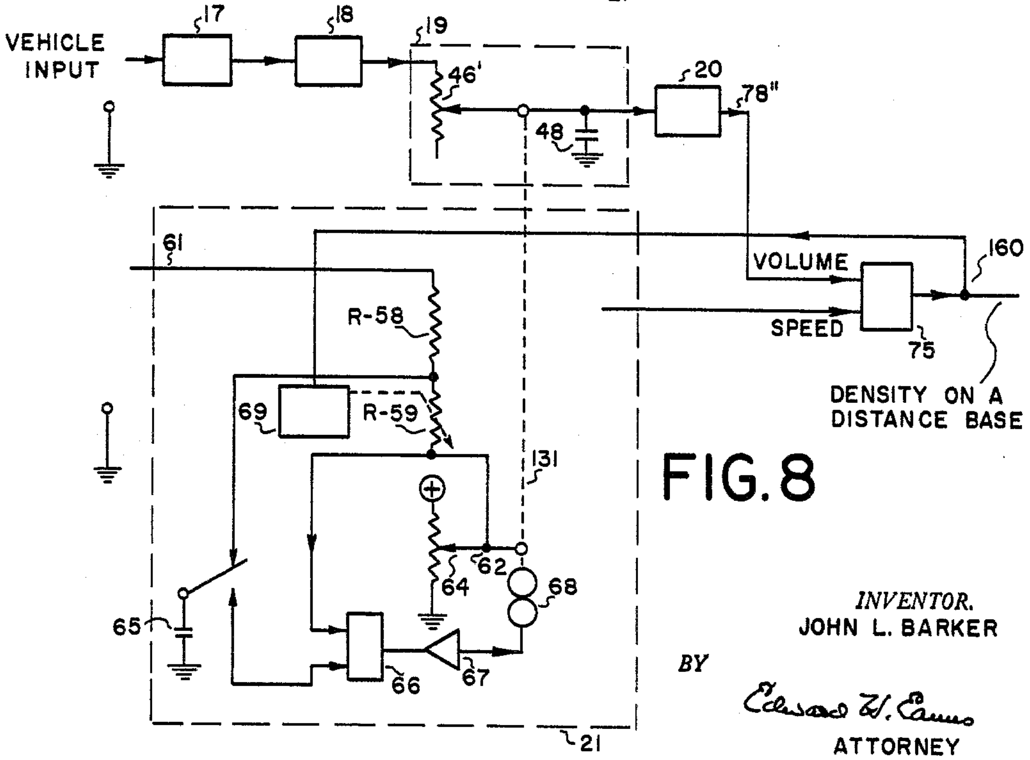
FIG. 8 illustrates partly in block and partly in schematic form, a modification of FIG. 7 in which the number of cars potential divider circuit is controlled by the density output rather than the volume output.
Figure 9:
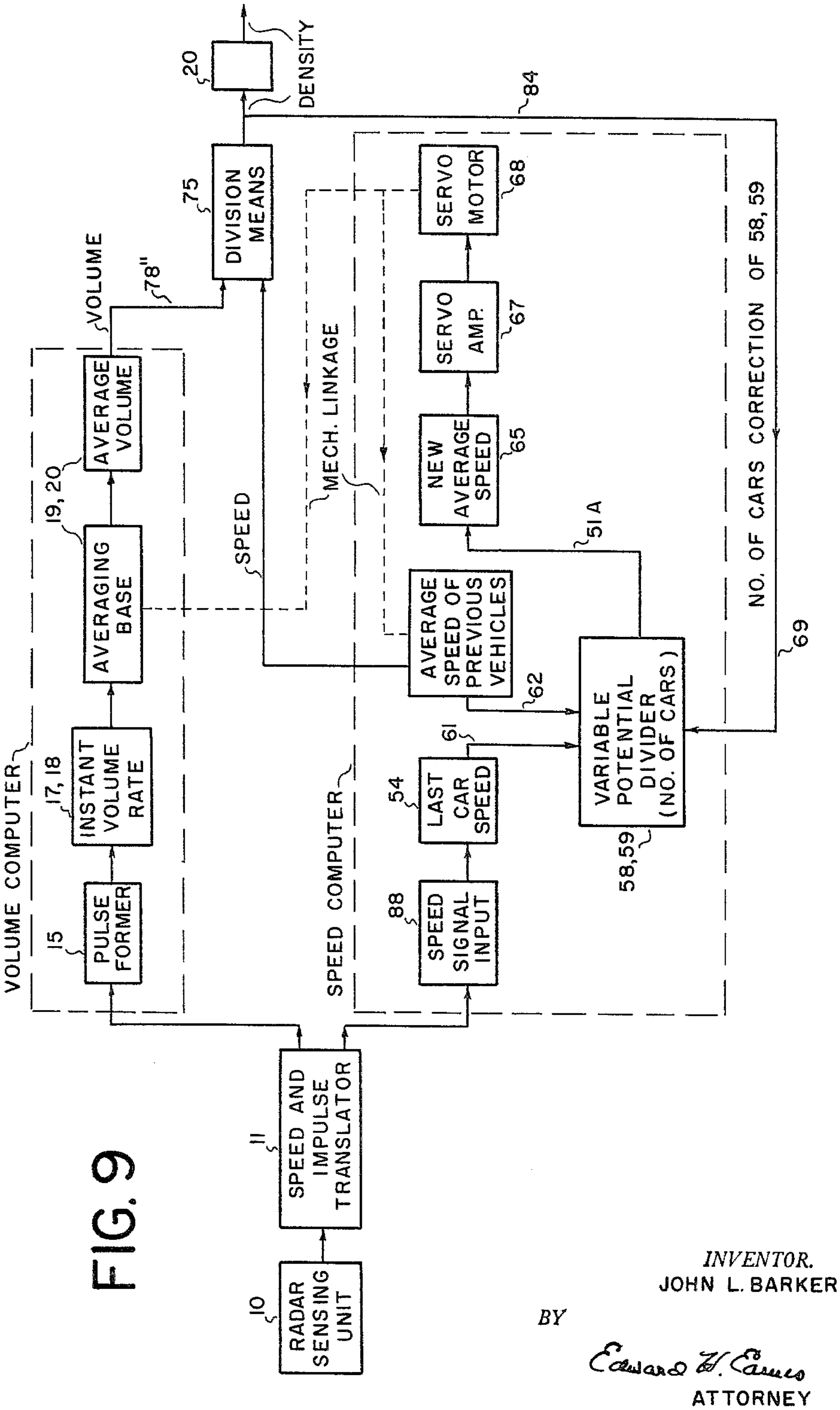
FIG. 9 illustrates in block form the overall cooperation of FIGS. 7 and 8 in a complete density computer.

A further refinement of the embodiment of FIG. 1 will appear in FIG. 6 and further embodiments of the invention may be provided as disclosed in FIGS. 7–9 and as further modified in FIG. 10. In order to more clearly understand these refinements, modifications and the further embodiments of the invention, the operation of FIG. 1 will be discussed in more detail below.

The invention as described in FIG. 1 automatically provides a substantially continuous indication of traffic density by automatically continually dividing traffic volume by traffic average speed. To provide such a result, the volume measurement should be the rate of vehicles per unit of time rather than a number of vehicles and speed should be the average speed in miles per unit of time so that the result of the division is density in vehicles per mile.

To provide such continuous density indication, moving vehicles in the roadway may be sensed and a speed and a volume rate signal may be derived therefrom. If the density indication is to indicate substantially the present traffic conditions, the apparatus must both continually receive new vehicle information and discard information from vehicles which have long since passed from the point of measurement along the roadway so that a density determination is made only on vehicles which have recently passed the measuring point.

The above requirement of such a density computer may be explained as a requirement of continually sampling segments of traffic; the segment of traffic may be a time segment or a distance segment with respect to the measuring point. In one case, the sampling segment will include only those vehicles which have passed the measuring point within a previous time interval; in the latter case the sampling segment will include only those vehicles which have passed the measuring point and are within a fixed distance of the measuring point. When such a segment of traffic is considered with the sensing apparatus as a reference point, the individual vehicles sampled will be continually changing as the vehicles pass in and out of the sampling segment; the sample will include at any one time only those vehicles which are within a fixed distance downstream for example, from the sensing apparatus, or only those vehicles which have passed the sensing apparatus within the sampling time.

Since distance and time are reciprocals of each other with respect to speed, either sampling segment may be considered on either a time or distance base. For example, if the sampling period considered has a fixed time base, as in FIG. 1, a density computation will be made over a distance along the roadway which varies directly with the average speed of vehicles within the fixed time segment. On the other hand, if it is desired to provide a density determination over a fixed distance of roadway, the sampling time may be made to vary inversely with the speed of the vehicles being measured. In the latter method as subsequently described in connection with FIGS. 7–9, a density determination will be made of substantially all the vehicles in the fixed segment of roadway with respect to the sensing apparatus.

Another requirement of a continuous density indication by division is that the speed measurement will include a plurality of vehicles and should be the average speed of substantially the same vehicles which are being sampled. Since individual vehicles within such a time or distance sample of roadway may have individually varying speeds, (particularly in light traffic conditions), the speed of an individual vehicle will change the average speed of the sample; the amount of change should depend upon the total number of vehicles previously sampled which produced the previous average speed.

These functions are provided in FIG. 1 as follows:

*The volume rate circuit.*—The instantaneous volume rate of vehicles passing the sensing point is produced in block 17 of FIG. 1 by capacitor 41 in parallel with resistor 42; the time constant being short; twenty (20) seconds, for example. Capacitor 41 is being continually incrementally charged by successive vehicles and resistor 42 leaks off some charge between such successive vehicles so that the voltage across this capacitor varies on both sides of an average voltage which may be referred to as a reference voltage. The reference voltage represents the instantaneous volume rate in vehicles per hour, for example.

If the rate of vehicles per unit of time is substantially constant at a first value, the voltage across capacitor 41 will vary about a first reference value.

If the rate of vehicles per unit of time should increase above the first value, then the capacitor 41 will charge more frequently and will have less leakage time between sucessive vehicles. As a result, there will be a transition period during which the voltage across capacitor 41 will rise to higher and higher voltages until a new steady rate equilibrium condition exists in which the voltage of capacitor 41 is again leaking off between successive vehicles substantially the same amount of charge as it gains by the passage of each single vehicle but at a new higher voltage value.

Thus assuming that the vehicles on the roadway maintain this new higher rate, the voltage across the capacitor 41 will vary slightly about a higher reference value than the assumed steady state first reference value; thus the higher voltage across capacitor 41 represents a higher volume rate.

If the rate of vehicles decreased from the first rate, the reverse of the above will occur; that is, a transient response will first occur in which the voltage across the capacitor decreases (because there is a longer discharge time between successive vehicles) and if the lower rate is maintained, as a steady state, the voltage across capacitor 41 will vary above and below a reference value which is lower than the first reference value; thus the lower voltage on capacitor 41 represents a lower volume rate.

Thus the voltage on capacitor 41 represents the value of the rate of vehicles per unit time or traffic volume whether that volume is constant or increasing or decreasing. This may be thought of as a short time averaging or instantaneous volume rate measurement.

*Averaging over a time base.*—The instantaneous volume rate circuit 17 of FIG. 1 is substantially a short time constant circuit. The output of the volume rate circuit is connected to a longer time constant circuit block 19 including capacitor 48, resistors 46', 49 and diodes 47' and 50 (or merely a single resistor 46' as in FIG. 5). Block 19 will average the volume rate over a desired R–C time base. The input to block 19 may be a voltage which is increasing, decreasing or varying about various reference values as described above. Capacitor 48 will normally follow the variations of capacitor 41, with a time lag.

If the voltage on capacitor 41 is increasing, capacitor 48 will charge to the value of 41 through resistor 46'. If the voltage on 41 is decreasing, capacitor 48 will follow this decrease through resistor 49 to the value of 41. Hence block 19 is referred to as an up-down averaging circuit.

Alternatively capacitor 48 may follow both the rise and fall of capacitor 41 through the single resistor 46' of FIG. 5. The use of two resistors and diodes has the advantage of providing individual adjustments for responding more rapidly to increasing or decreasing functions as desired. For example, it may be desirable to have the apparatus respond rapidly to increasing volume or density measurement and respond more slowly to decreasing volume or density or vice versa.

The time constant of block 19 in FIG. 1 may, for example, be manually adjustable between one to six minutes. When once adjusted the time constant is fixed in FIG. 1 in contrast with the embodiment of FIGS. 7–9 to be described subsequently. Since this time constant of 19 is longer than that of capacitor 41 and resistor 42, it is less susceptible to variations of the input voltages from 18 and thus provides an output voltage which is the average volume rate; furthermore the output of block 19 is the average volume rate for the time constant of the circuit as will be explained below.

The input signals to block 19 of FIG. 1 and the time constant circuit of capacitor 48 will have various values as discussed above. Assuming, for example, that a constant rate of traffic (assume 12 vehicles/minute) is flowing past the sensing point, the input signal to block 19 will be a signal having an average reference voltage dependent upon this constant rate and will vary above the average value when a vehicle is present and below that reference point between successive vehicles. Consequently, if the rate of vehicles remains constant, capacitor 48 will have substantially reached this average point.

Assume that the R–C time constant of block 19 is three minutes. Assume also that, at time zero, a vehicle arrives, this will raise the voltage input to 19 instantaneously and will cause capacitor 48 to charge slightly. Subsequently after time zero capacitor 48 will lose some charge because no vehicle is present. If succeeding vehicles occur every five seconds for three minutes ($t=5$, $t=10$—etc.) capacitor 48 will be alternately charged incrementally and discharged slightly until the voltage on capacitor 48 reaches the average voltage mentioned above of twelve vehicles per minute.

After the three minute period, the voltage on capacitor 48 represents 720 vehicles/hour or thirty six vehicles for the previous three minute period and will remain at this voltage if the rate of vehicles remains constant. Now, if a vehicle does not appear at time $t=3$ minutes and 5 seconds (3:05) the absence of the input pulse will cause capacitor 48 to lose an incremental charge, in effect, by the progressive reduction of charge at an exponential time rate between vehicles. This loss in charge of capacitor 48 as the result of absence of vehicle at time 3:05, thus may be compared in some respects to a check-out of the first vehicle which was checked-into capacitor 48 at time $t=0$.

If at time $t=3$ minutes and ten seconds, still no vehicle has appeared, capacitor 48 will lose in effect another incremental charge which may be compared in some respects to a check out of the vehicle which was checked into capacitor 48 at time $t=10$ seconds. At this time, the voltage on capacitor 48 will represent 34 vehicles in the three minute period (a loss of two vehicles).

If no subsequent vehicles appear up to time $t=6$ minutes, capacitor 48 will be nearly discharged and this will indicate that no vehicles have been present for the last three minutes. Thus the time constant of block 19 including capacitor 48 and its resistor provides a time base and an indication of the number of vehicles over that time base.

Should the rate of vehicles be increased or decreased from the assumed value of 720 vehicles per hour, the value of charge of capacitor 48 will be slowly raised or lowered respectively to a new average reference level.

The resistors 46' and 49' or the single resistor 46' of FIG. 5 are both variable as shown and may therefore vary the time base of the apparatus.

The above discussion clearly shows that block 19 in FIG. 1 derives an averaging of the instantaneous rates over a sample period of time which sample time period may be varied as desired and that the output is proportional to the number of vehicles within the time base.

During this sample period of time, the vehicles sampled have moved some varying distances from the sensing point depending upon their average speed. Hence the sample of vehicles in FIG. 1 is made over a distance which is directly proportional to average speed.

*The speed averaging circuit.*—The speed averaging circuit of FIG. 1, included a voltage divider having two thermistors 58 and 59. The speed of an individual vehicle is derived at 54 and exists on line 61 at the left end of the divided. The previous average speed is stored on arm 64 at contact 62 to the right side of thermistor 59. A comparison of the speed of the individual vehicle and the previous average speed produces a new speed average voltage on capacitor 65 which is compared with the previous average speed through chopper 66, amplifier 67 and servo motor 68 to drive the previous average speed storage means to the new average speed for further comparison.

Two factors are significant in respect to this divider and speed averaging circuit. One factor is that the speed average should preferably be of the same vehicles whose volume rate is being determined. The second factor is that in averaging speed, the speed of one vehicle should preferably affect the previous average speed only as a proportion of one to the number of vehicles which have determined the previous average speed.

In some traffic conditions, such as a constant flow of traffic, the quantity of vehicles during a particular sampling time period or in a particular distance along a roadway will be relatively constant. In such a case, it would be sufficient to compare the speed of a single vehicle against a constant average speed reference voltage. However, where the traffic along a roadway is not constant, as is the usual case, the number of vehicles which are being sampled is variable. Consequently the effect of a single vehicle on the determination of average speed must also be variable. The connection of line 78″ to block 69 provides this correction by varying the ratio of thermistor 59 to the total impedance of the divider circuit 58, 59 so that the speed of an individual vehicle will have more or less effect.

For some selectable short period of time such as the three minute period referred to before, the average volume on capacitor 48 or line 78″ is proportional to the *number* of *vehicles* present on the roadway during the three minute period. The number of vehicles therefore controls the block 69 and thermistor 59 to vary the proportion of the divider and thereby provide an accurate determination of average speed which may be divided into the volume measurement and provide a density output.

A further refinement of the speed averaging circuit of FIG. 1 is shown in FIG. 6. When the single resistor 46′ of FIG. 5 or the resistors 46′ and 49 of FIG. 1 are adjusted, the sampling time base is increased or decreased as the resistance is increased or decreased. The voltage on capacitor 48 therefore represents a large or smaller number of vehicles directly proportional to the time base even thuogh the rate of vehicles may be unchanged. The voltage normally across the divider 58, 59 of the speed averaging circuit may be adjusted to provide sufficient accuracy for limited variations of such time base. However, for wider variations in the time base, such as 1–6 minutes for example, as the time base resistance is increased thereby increasing the number of vehicles averaged over the increased time base, thermistor 58 or 59 may also be adjusted to decrease the effect of the single vehicle on the average speed.

In addition, when a single vehicle is being averaged against an increasing number of vehicles, the effect of the single vehicle is decreasnig. Accordingly there will be a smaller difference voltage between the previous average speed and the new average speed which are the two inputs to the chopper 66 of FIG. 1 so that a smaller output is available to drive the servo motor. Therefore the gain of the succeeding amplifier 67 should be increased to provide a substantially constant output to servo motor 68 thereby minimizing hunting.

These above relationships are provided in FIG. 6 by the ganging of the resistor 46′ of block 19, thermistor 58 and the gain control 133 of amplifier 67 so that as the resistance of 46′ increases, R–59 may be decreased or R–58 increased, and the gain of amplifier 66 increased. A reverse operation occurs if 46′ is decreased.

The above operation is provided by a variable time base adjusting knob 132 which is mechanically ganged at 150 to 46′, 58 and 67.

The above description has been added to more clearly point out the operation of FIG. 1 as a constant time base, variable distance computer of traffic density in which various time bases may be used and to further point out refinements which may be made as desired all as an introduction to a further embodiment of the invention.

At times, it may be desirable to compute the traffic density for a fixed distance along the roadway, as for example, one mile. This type of operation may be obtained by utilizing a time sampling base which is variable inversely with speed in contrast with the fixed time base of FIG. 1. This fixed distance determination occurs because of the inverse relation between time and distance with speed.

For example, in FIG. 7 if the traffic density sampling is computed over a long time if the average vehicle speed is low, and over a short time if the average vehicle speed is high, we can compute traffic density over the same distance in both cases. The sampling distance will be constant if the product of speed and time is constant. To provide such a constant distance sampling, resistor 46′ of FIG. 7 may be connected to the speed shaft 130 of servo motor 68 so that the resistance of 46′ varies inversely with speed. This will provide a variable time base for FIG. 7.

Accordingly, for any particular volume rate, the number of vehicles which are averaged will vary directly with the time base and inversely with speed. Consequently, a proportion is necessary on the divider 58 and 59 which also varies inversely with speed to accurately adjust the effect of one car speed on line 61 to the previous average speed at point 62 in deriving a new average speed across condenser 65. Such operation may be provided by adjusting R–58 inversely with speed and directly with R–46′ by the common linkage 130.

Thus as the speed increases, R–46′ would be decreased, thereby decreasing the RC time base of C–48 and R–46′. For any given volume rate, a smaller number of cars would thus be included in the average volume indication on line 78″. Therefore, in the divider 58, 59, the effect of an individual vehicle on the average speed should be greater. Decreasing 58 will provide this greater effect of the individual vehicle. Line 78″ will still control thermistor 59 through block 69 so that the actual number of cars for a given time base will determine the effect of the individual vehicles. The block diagrams and other circuitry of FIG. 7 will be the same as in FIG. 1, although it will be appreciated that the division means 75 may be the same as in FIG. 3. Accordingly for convenience similar numerals are used as in FIG. 1.

Still another embodiment as shown in FIG. 8 of a constant distance density determination apparatus would include the ganging of R–46′ to vary inversely with speed as disclosed above in FIG. 7 to provide a variable time base average volume with a constant product of speed and time. However, rather than having the thermistor 59 controlled by the number of cars for the particular time base as determined at line 78″ of the volume computer through 69, the density output at 160 may be used to control thermistor 59 through block 69. This is possible since density in vehicles per mile for a fixed distance is proportional to the number of vehicles within the sampling time base upon which all calculations are based. The gain of the amplifier 67 may be adjusted as described previously in FIG. 5.

Otherwise FIG. 8 is substantially the same as FIG. 7 and FIG. 1. Shaft 131 coupled servo motor 68 to time base resistor 46′ to provide an inverse speed and time base relation. R–58 need not be coupled to this shaft as it was in FIG. 7, because the variation in the time base with speed will vary the density output which will then automatically correct the divider circuit for that time base as well as for the number of vehicles sampled.

A still further modification of FIG. 1 would be to place the up-down circuit of block 19 at the output of the density computer. Between blocks 18 and 20 in the volume computer, there would be merely capacitor 48 and resistor 46'. This would provide the same time constant circuit for both increases and decreases in traffic volume rates while providing fast and slow responses to increasing and decreasing density variations.

The purpose of an up-down circuit is to provide a gradual indication of a change in one direction and a rapid indication in response to changes in the other direction.

Capacitor 48 of block 19 provides an output representative of the average volume rate. As such it may well be of interest to rapidly or gradually know of changes in such a quantity. However, the factor which is controlling the speed averaging circuit through block 69 is the integral of the value of voltage on capacitor 48 over the time sampling base and is equal to the number of vehicles being sampled. Consequently it is desirable to have the same rise and fall characteristic in the volume circuit and place the up-down circuit at the density output.

If the charge on capacitor 48 rises rapidly and falls slowly, the integral value is a less accurate determination of the number of vehicles than if the rise and fall are guided by the same time constant.

An up-down circuit may then be placed at the output of the density computer.

FIG. 9 illustrates in block form the overall cooperation of elements to provide a density determination over a constant distance base. In general FIG. 9 includes many of the elements of FIG. 1 and those modifications suggested in FIGS. 7 and 8. However, the number of cars circuit is controlled by the density output of 75, as in FIG. 8, rather than the volume as in FIG. 7. To make FIG. 9 correspond with FIG. 7, a mechanical linkage would be coupled from the servo motor 68 to 58, 59 and the output of the volume computer would control 58, 59 through line 78''.

It will be appreciated that while FIGS. 7–9 may determine traffic density over a fixed distance of one (1) mile for example, it may be desired to compute traffic density over ¼ mile or ½ mile or two miles, etc.

To provide such a variation in distance several methods are available. Since the product of speed and time base is proportional to distance, the time base may be decreased if the density determination is to be made over one-quarter or one-half mile and increased if the density determination is to be made over two miles, for example.

Accordingly FIG. 10 shows a distance selector switch including knob 134 which is mechanically linked at 135 to switch contact arms 137 and 142.

Four resistors 46', each having different values, and connected individually to terminals 138–141 and commonly connected at 148 to capacitor 48 may be selected by the switch arm 137 to provide one of four available time base circuits for the volume computer time base of FIGS. 7–9, for the desired distance base. This may be calibrated in distance if desired.

For example, if it is desired to measure density over a distance of one mile, switch 137 may be connected to terminal 140 so that a fairly large resistor 46' is connected in series with condenser 48.

It is desired to measure density over some fraction of a mile; for example, switch 137 may be connected to terminals 138, or 139 thereby connecting a smaller value of resistance 46' in circuit with condenser 48.

Alternatively to measure density over 2 miles, for example, switch 137 may be connected to terminal 141 which is connected to a higher valued resistor 46'.

Since the time base of the volume computer is modified by switch 137 to vary the distance determination of a fixed distance density determining apparatus, the base of the speed averaging computer must also be modified so that the volume and speed measurements are on the same base. Therefore the density output which results from the division of these two quantities is on the same base.

Therefore switch 142 is ganged through 135 to the common knob 134 so that a variation of the distance measurement (such as ¼, ½, 1, or 2 miles) by varying the time base at 137 also varies the selection between one of four resistors 58.

For example, if the density is measured over ¼ mile rather than 1 mile, the switch 137 is connected at 138 to provide a lower time base volume averaging circuit. For any given rate of vehicles fewer vehicles will be measured within this time base and hence the effect of a single vehicle speed at 61 should have a greater effect on the speed averaging divider 58, 59 between 61 and 62 than a single vehicle would have had for a measurement over one mile. Consequently the value of R–58 connected to terminal 143 will be of a lesser value than the resistor connected to terminal 145, for example.

Since the modification of FIG. 10 is adapted to cooperate with the fixed distance density determination of FIGS. 7–9, a mechanical linkage 136 is shown connected to servo motor 68 to vary resistors 46' and 58 inversely with speed.

R–59 of the speed averaging circuit will be controlled through 69 from either the volume output as in FIG. 7 or the density output as in FIG. 8. In the later case, the linkage 136 would not be connected to R–58.

FIGS. 6 and 10 both show a part of the means for putting the volume and speed measurements on the same base. The necessity of such a common base is apparent if one of the quantities to be divided has a selectable range and variations in quantity may occur within each range while still using the same indicating means for all ranges.

It has been found convenient that the measured volume by the volume computer be made over a predetermined fraction of an hour, as for example $\frac{1}{10}$ of an hour, or six minutes or $\frac{1}{20}$ of an hour or three minutes, as desired, while such volume may be calibrated and indicated in longer periods of time, as for example, vehicles per hour. Thus a measurement of 20 vehicles over $\frac{1}{10}$ of an hour may correspond to 200 vehicles per hour, for example, or 40 vehicles over $\frac{1}{10}$ of an hour may correspond to 400 vehicles per hour, etc.

Thus if, for convenience the volume computer is assumed at the moment to be on a time base of $\frac{1}{10}$ of an hour, as controlled by the speed computer, the volume computer ranges may be 0–20 vehicles per 6 minutes corresponding to 0–200 vehicles per hour, 0–40 vehicles per six minutes corresponding to 0–400 vehicles per hour, 0–60 vehicles per 6 minutes corresponding to 600 vehicles per hour, etc. and thus the speed measurement must also be capable of being made so that the speed of the last one vehicle is averaged against the average of the last 20 vehicle speeds, in the 0–20 range, and the speed of the last one vehicle is averaged against that of the last 40 vehicles in the 0–40 range etc. Thus the volume and speed circuits must have the same common base of 20, 40 or 60 vehicles; the common base is provided in FIG. 6 by mechanical linkage 150 which gangs 46' and 58 to knob 132. In FIG. 10, this common base is provided by the selector switch including knob 134, linkage 135 and switches 137 and 142 which provide proportionate values of 46' and 58.

Within such a common base in FIG. 6 and 10 the flow of traffic would normally be some value less than 200 vehicles/hour, 400 vehicles/hour, or 600 vehicles/hour etc., and correspondingly 20 vehicles, 40 vehicles or 60 vehicles per six minutes for example. Therefore the effect of a single vehicle on the speed averaging circuit will be some fraction of $\frac{1}{20}$, $\frac{1}{40}$, or $\frac{1}{60}$ etc. The thermistor 59 will be controlled by 69 from the volume or density in proportion to the actual number of cars within the time or distance sampling segment.

The divider circuit shown herein has been disclosed as two thermistors in series. However, it will be appreciated that a single thermistor may be used or that one thermistor 59 may be connected to a resistor 58.

The advantage of two thermistors is that in the divider circuit, they compensate for changes in ambient temperature.

When a single thermistor is used, it is placed in a box which is enclosed in an oven similar to a controlled oven for a crystal. The oven is kept at a temperature higher than room temperature for example 180° Fah. The box and thermistor then assume this temperature and are not affected by ambient atmospheric temperature.

As the thermistor is heated, by control from either the volume or density computer, it rises in temperature above 180° Fahrenheit and varies the resistance of R–59 as desired. To whatever extent the thermistor heater 73 may heat the oven, the oven thermostat will automatically reduce the amount of heat applied by the main oven heater and thus maintain the constant oven temperature of 180°.

Figure 11:
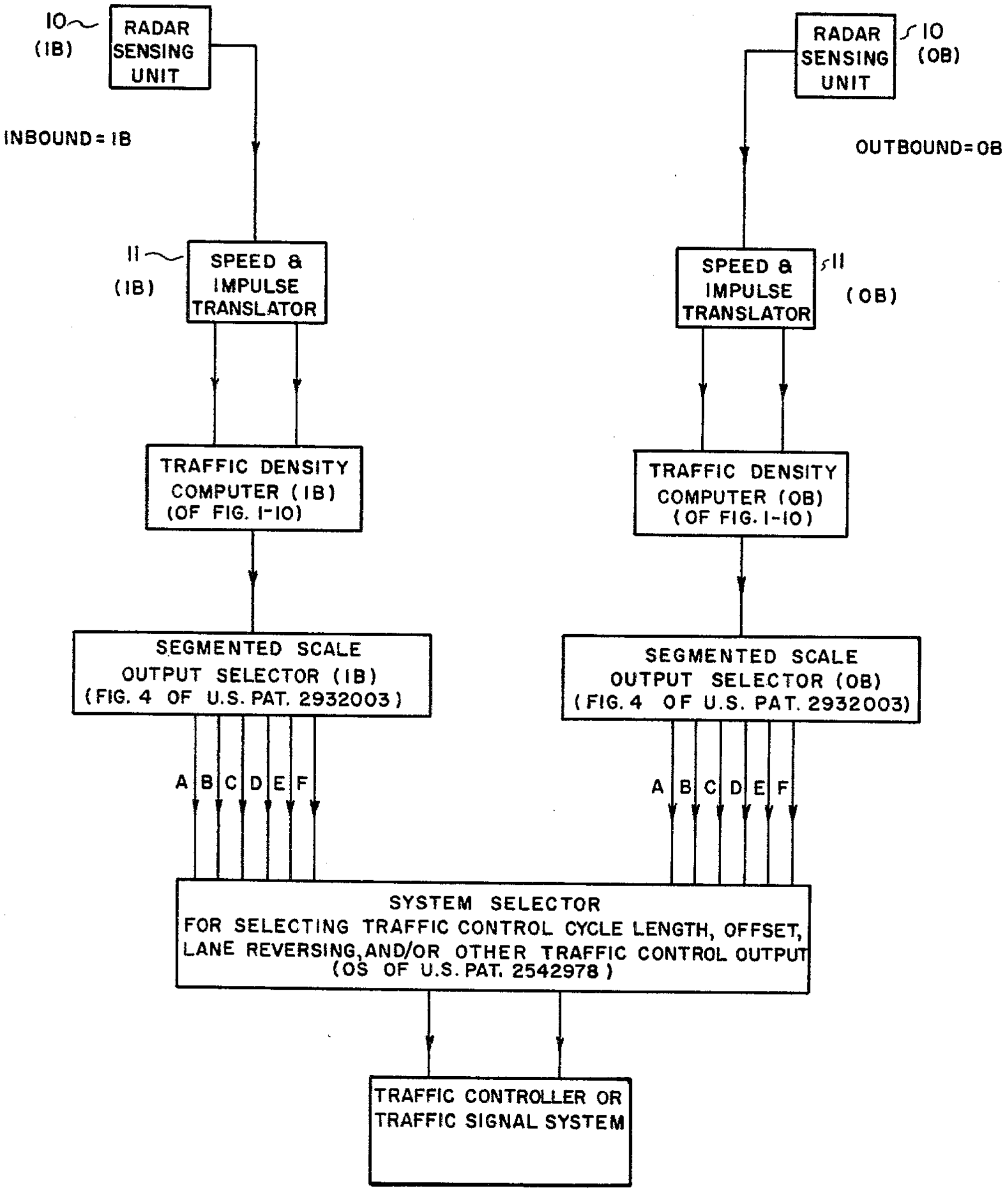
FIG. 11 illustrates, in block form, a traffic control system employing two traffic density computers for two traffic directions for control of a system selector for various traffic control purposes.

FIG. 11 illustrates in block diagram form a traffic control system providing a selective or variable output for traffic control purposes based on the measurement of traffic density individually in two traffic directions, referred to as inbound and outbound for example, although not limited thereto. The selective control is provided by a system selector in response to the relative outputs of two traffic density computers (IB) and (OB) for the respective traffic directions. These computers each may be of the type shown in FIG. 1 or any of the alternate forms of FIGS. 2–10, and may receive traffic impulses for traffic volume and speed information from respective traffic sensing units as Radar Sensing Units 10 (IB) and 10 (OB) and speed and impulse Translator Units 11 (IB) and 11 (OB). The selective output control is provided from comparison of the outputs of the respective traffic density computers by a system selector OS which may be of the type similarly designated in U.S. Patent 2,542,978 referred to above. For providing segmented scale inputs to the system selector of the type referred to for example the voltage output of the density computer is applied to a scale segmenting circuit, which provides an output on only one at a time of several (six for example) output circuits corresponding to the appropriate segment of a full scale of the density indicating voltage. This scale segmenting circuit may be of the type illustrated in FIG. 4 of my U.S. Patent 2,932,003 issued April 5, 1960, for example which selects one of several outputs over a voltage scale in accordance with the voltage impressed and with adjustable transfer points between the successive scale segments and corresponding output circuits.

As more fully described in my aforesaid U.S. Patent 2,542,978 the system selector OS may select one of its outputs in response to the density output of the IB density computer being substantially higher than that of the OB density computer, and may select a second output in response to the output of the OB density computer being substantially higher than that of the IB density computer and may provide a third output, being a combination of two output lines for example, for substantially balanced density outputs from both computers or in response to such density outputs not differing more than a predetermined amount.

The output selected by the system selector may be used to control the offsets of a master-local traffic signal system or may be used for controlling the direction of traffic flow in one or more reversible lanes in accordance with the relative traffic density in opposite directions along roadway, or may be used for other purposes by control of traffic signals or traffic directing signs or other forms of traffic control.

The term "passing vehicles" and the like refers to vehicles passing a point on the roadway, as for example the point on the roadway at which is situated the sensing unit or detector.

Thus, among others, the several objects in the invention as specifically aforenoted, are achieved. Obviously, numerous changes in construction and rearrangement of parts might be resorted to without departing from the spirit of the invention as defined by the claims.

I claim:

1. A device for determining the density of traffic passing along a roadway comprising: a traffic volume computer including a vehicle detecting means, and an impulse generating means for generating electrical impulses upon detection of a passing vehicle by said vehicle detecting means, means for converting the electrical impulses generated by said generating means to a direct current voltage proportional to the number of vehicles detected by said vehicle detector per unit time; a speed computer including means for obtaining a signal representative of the speed of the passing vehicles, a mechanical output shaft of said speed computer and means for positioning said output shaft in accordance with the speed signal; a further computer including a potentiometer having a resistance element and a contact arm mechanically linked to said output shaft, a density direct current voltage applied across said potentiometer resistance element, voltage comparison means, means electrically connecting the potential of said arm to said comparison means, means electrically connecting said direct current voltage output to said comparison means, and means controlled by said comparison means for altering said density direct current voltage in accordance with a comparison made by said comparison means.

2. A device for determining the density of traffic passing along a roadway comprising: means for detecting such vehicles, an impulse generating means for generating electrical impulses upon detection of a vehicle by said vehicle detector, means for converting the electrical impulses generated by said generating means to a direct current voltage proportional to the number of vehicles detected by said vehicle detector per unit time, means for obtaining a signal representative of the speed of such passing vehicles, a mechanical output shaft and means for positioning said output shaft in accordance with the speed signal, a potentiometer having a resistance element, a density direct current voltage applied across said potentiometer resistance winding, an arm of said potentiometer mechanically linked to said output shaft to be positioned along said resistance element thereby, voltage comparison means, means electrically connecting the potential of said arm to said comparison means, means electrically connecting said direct current voltage output to said comparison means, an alternating current amplifier, an input circuit to said amplifier, means applying alternating current voltage to said input circuit, means controlled by said comparison means for altering the alternating current voltage applied to said amplifier, a rectifying means receiving the output of said alternating current amplifier, and means applying the output of said rectifier means to alter the density direct current voltage on said potentiometer.

3. A device for determining the density of traffic passing along a roadway comprising: a volume computer including a vehicle detector, an impulse generating means for generating electrical impulses upon detection of a vehicle by said vehicle detector, means for converting the electrical impulses generated by said generating means to a direct current voltage output proportional to the number of passing vehicles detected by said vehicle detector in a unit time; a speed computer including means for obtaining a signal representative of speed of the passing vehicles, a mechanical output shaft of said speed computer and means for positioning said output shaft in accordance with the speed signal; and a further computer including a potentiometer having a resistance winding with one side grounded, a contact arm of said potentiometer mechanically linked to said output shaft to be positioned thereby, a comparison means, means electrically connecting said direct current voltage output to said comparison means, means electrically connecting the potential of said arm to said comparison means, an alternating current amplifier whose input is controlled by said comparison means, an alternating current input to said alternating current amplifier, rectifying means receiving the output of said alternating current amplifier, and means applying the output of said rectifying means to the remaining side of said potentiometer resistance winding.

4. A device for determining the density of traffic passing along a roadway comprising: a volume computer including a vehicle detector, an impulse generating means for generating electrical impulses upon detection of a vehicle by said vehicle detector, means for converting the electrical impulses generated by said generating means to direct current voltage proportional to the number of vehicles detected by said vehicle detector in a unit time, and a direct current output of said volume computer; a speed computer including means for obtaining a signal representing the speed of a passing vehicle, storage means for storing a series of said speed signals, a potentiometer having an arm whose position represents the average speed of the latest predetermined number of vehicles, comparing means, means electrically connecting said potentiometer arm to said comparing means, divider means, means electrically connecting said storage means to the input of said divider means, means electrically connecting the output of said divider means to said comparing means, a servo motor mechanically connected to said potentiometer arm and driven by the output of said comparing means for positioning said potentiometer arm in accordance with the output of said comparing means, and means controlled by said volume computer for adjusting said divider means whereby the input to the comparing means from said storage means is for a series of speed signals developed by the vehicles sensed by said impulse generating means in said volume computer; and a further computer including a further potentiometer having a resistance element and a movable contact arm mechanically linked to said first mentioned potentiometer arm, a density direct current voltage applied across said further potentiometer resistance element, voltage comparison means, means electrically connecting the potential of said further potentiometer arm to said comparison means, means electrically connecting said direct current output to said comparison means, and means controlled by said comparison means for altering said density direct current voltage in accordance with a comparison made by said comparison means.

5. A device for determining the density of traffic on a roadway comprising: a volume computer including a vehicle detector, an impulse generating means for generating electrical impulses upon detection of a vehicle by said vehicle detector, means for converting the electrical impulses generated by said generating means to direct current voltage proportional to the number of vehicles detected by said vehicle detector in a unit time, and a direct current output of said volume computer; a speed computer including means for obtaining a signal representative of the speed of the passing vehicles, storage means for storing a series of signals, a potentiometer, an arm of said potentiometer whose position represents speed of vehicles, a chopper, an input to said chopper electrically connected with the potentiometer arm, a divider, a second input to said chopper electrically connected with the output of said divider, a servo motor, an output of said chopper electrically connected to said servo motor, a mechanical linkage linking said servo motor and said potentiometer arm; divider altering means actuated by said direct current output of said volume computer, said altering means being constructed and arranged to decrease the voltage applied by said divider to said chopper upon increase of said direct current output of said volume computer; and a further computer including a further potentiometer having a resistance element, an arm of said potentiometer mechanically linked to said first mentioned potentiometer arm, a density direct current voltage applied across said further potentiometer resistance element, voltage comparison means, means electrically connecting the potential of said further potentiometer arm to said comparison means, means electrically connecting said direct current output to said comparison means, and means controlled by said comparison means for altering said density direct current voltage in accordance with a comparison made by said comparison means.

6. A device for determining the density of traffic on a roadway comprising: a volume computer including a vehicle detector, an impulse generating means for generating electrical impulses upon detection of a vehicle by said vehicle detector, means for converting the electrical impulses generated by said generating means to direct current voltage proportional to the number of vehicles detected by said vehicle detector in a unit of time, and a direct current output of said volume computer; a speed computer including means for obtaining a signal representative of the speed of a passing vehicle, storage means for storing a series of speed signals, a potentiometer, an arm of said potentiometer whose position represents average speed of vehicles, a chopper, a first input to said chopper electrically connected to said potentiometer arm, an output of said chopper, a servo motor mechanically connected to said potentiometer arm, means connecting the output of said chopper to said servo motor, divider means including a thermistor having an input connection to said storage means and an output connection to said second input of said chopper, a heater element adjacent said thermistor, means applying said direct current output of said volume computer to said heater element whereby the ohmic value of said thermistor decreases as said direct current output of said volume computer increases whereby the voltage applied to said second input of said chopper decreases; and a further computer including a further potentiometer having a resistance element, an arm of said further potentiometer mechanically linked to said first mentioned potentiometer arm, a density direct current voltage applied across said further potentiometer resistance element, voltage comparison means, means electrically connecting the potential of said further potentiometer arm to said comparison means, means electrically connecting said direct current output to said comparison means, and means controlled by said comparison means for altering said density direct current voltage in accordance with a comparison made by said comparison means.

7. A device for determining the density of traffic on a roadway comprising: a volume computer including a vehicle detector, an impulse generating means for generating electrical impulses upon detection of a vehicle by said vehicle detector, means for converting the electrical impulses generated by said generating means to direct current voltage proportional to the number of vehicles detected by said vehicle detector in a unit time, and a direct current output of said volume computer; a speed computer including means for obtaining a signal representative of speed of a passing vehicle, storage means for storing a series of said speed signals, a potentiometer, an arm of said potentiometer whose position represents average speed of vehicles, comparing means, means electrically connecting said potentiometer arm to said comparing means, divider means, means electrically connecting said storage means to the input of said divider means, means electrically connecting the output of said divider means to said comparing means, a servo motor mechanically connected to said potentiometer arm and driven by the output of said comparing means for positioning said potentiometer arm in accordance with the output of said comparing means, and means controlled by said volume computer for adjusting said divider means whereby the input to the comparing means from said storage means is for a number of vehicles corresponding to the number of vehicles of the volume computer and the reading from said storage means is for a series of speed signals developed by the vehicles sensed by said impulse generating means in said volume computer; and a further computer including a further potentiometer having a resistance element, an arm of said further potentiometer mechanically linked to said output shaft, a comparison means, means electrically connecting said direct current output to said comparison means, means electrically connecting the potential of said arm to said comparison means, an alternating current amplifier whose input is controlled by said comparison means, an alternating current input to said alternating current amplifier, rectifying means receiving the output of said alternating current amplifier, and means applying the output of said rectifying means to said further potentiometer resistance element.

8. A device for determining the density of traffic on a roadway comprising: a volume computer including a vehicle detector, an impulse generating means for generating electrical impulses upon detection of a vehicle by said vehicle detector, means for converting the electrical impulses generated by said generating means to direct current voltage proportional to the number of vehicles detected by said vehicle detector in a unit time, and a direct current output of said volume computer; a speed computer including means for obtaining a signal representative of the speed of a passing vehicle, storage means for storing a series of said speed signals, a potentiometer, an arm of said potentiometer whose position represents average speed of the passing vehicles, a chopper, a first input to said chopper electrically connected to said potentiometer arm, an output of said chopper, a servo motor mechanically connected to said potentiometer arm, means connecting the output of said chopper to said servo motor, divider means including a thermistor having an input connection to said storage means and an output connection to a second input of said chopper, a heater element adjacent to said thermistor, means applying said direct current output of said volume computer to said heater element whereby the ohmic value of said thermistor decreases as said direct current output of said volume computer increases whereby the voltage applied to said second input of said chopper decreases; and a further computer including a further potentiometer having a resistance element, an arm of said further potentiometer mechanically linked to said first mentioned potentiometer arm, a comparison means, means electrically connecting said direct current output to said comparison means, means electrically connecting the potential of said further potentiometer arm to said comparison means, an alternating current amplifier whose input is controlled by said comparison means, an alternating current input to said alternating current amplifier, rectifying means receiving the output of said alternating current amplifier, and means applying the output of said rectifying means to said further potentiometer resistance element.

9. A device for determining the density of traffic on a roadway comprising: a volume computer including a vehicle detector, an impulse generating means for generating electrical impulses upon detection of a vehicle by said vehicle detector, means for converting the electrical impulses generated by said generating means to direct current voltage proportional to the number of vehicles detected by said vehicle detector in a unit time; a speed computer including means for obtaining a signal representative of the speed of passing vehicles, a mechanical output shaft of said speed computer and means for positioning said output shaft in accordance with the speed signal; and a further computer including a potentiometer having a resistance element, an arm of said potentiometer mechanically linked to said output shaft, a density direct current voltage applied across said potentiometer resistance element, first voltage comparison means, means electrically connecting the potential of said arm to said first comparison means, means electrically connecting said direct current voltage to said first comparison means, and control means controlled by said first comparison means for altering said density direct current voltage in accordance with a comparison made by said comparison means; and a comparison potentiometer, a second comparison means, a voltage across said comparison potentiometer, an electrical connection between said potentiometer and said second comparison means, an electrical input to said second comparison means proportional to the position of said output shaft, means connecting the output of said second comparison means to further control said altering means.

10. A device for determining the density of traffic on a roadway comprising: a volume computer including a vehicle detector, an impulse generating means for generating electrical impulses upon detection of a vehicle detector, means for converting the electrical impulses generated by said generating means to direct current voltage proportional to the number of vehicles detected by said vehicle detector in a unit time; a speed computer including means for obtaining a signal representative of the speed of the passing vehicles, a mechanical output shaft of said speed computer and means for positioning said output shaft in accordance with the speed signal; and a density computer including a potentiometer having a resistance element, an arm of said potentiometer mechanically linked to said output shaft, a comparison means, means electrically connecting said direct current voltage to said comparison means, means electrically connecting the potential of said arm to said comparison means, an alternating current amplifier whose input is controlled by said comparison means, an alternating current input to said alternating current amplifier, rectifying means receiving the output of said alternating current amplifier, and means applying the output of said rectifying means across said potentiometer resistance element; and a comparison potentiometer, a voltage across said comparison potentiometer, a second comparison means, an electrical connection between said potentiometer and said second comparison means, an electrical input to said second comparison means proportional to the position of said output shaft, a second alternating current input to said amplifier controlled by said second comparison means.

11. A device for determining the density of traffic on a roadway comprising: a volume computer including a vehicle detector, an impulse generating means for generating electrical impulses upon detection of a vehicle by said vehicle detector, means for converting the electrical impulses generated by said generating means to direct current voltage proportional to the number of vehicles detected by said vehicle detector in a unit time; a speed computer including means for obtaining a signal representative of the speed of the passing vehicles, a mechanical output shaft of said speed computer and means for positioning said output shaft in accordance with the speed signal; and a density computer including a potentiometer having a resistance element, an arm of said potentiometer mechanically linked to said output shaft, a comparison means, means electrically connecting said direct current voltage to said comparison means, means electrically connecting the potential of said arm to said comparison means, an alternating current amplifier whose input is controlled by said comparison means, an alternating current input to said alternating current amplifier, rectifying means receiving the output of said alternating current amplifier, and means applying the output of said rectifying means across said potentiometer resistance element; and a comparison potentiometer, a voltage setting of said comparison potentiometer, a second comparison means, an electrical connection between said potentiometer and said second comparison means, an electrical input to said second comparison means proportional to the position of said output shaft, a second alternating current input to said amplifier controlled by said second comparison means whereby said second alternating current input is applied to said amplifier when the voltage which is proportional to the position of said output shaft exceeds the voltage setting of the potentiometer.

12. A device for determining the density of traffic on a roadway comprising: a volume computer including a vehicle detector, an impulse generating means for generating electrical impulses upon detection of a vehicle by said vehicle detector, means for converting the electrical impulses generated by said generating means to direct current voltage proportional to the number of vehicles detected by said vehicle detector in a unit time; a speed computer including means for obtaining a signal representing the speed of a passing vehicle, a storage means for storing a series of said speed signals, a potentiometer, an output shaft arm of said potentiometer whose position represents the speed of the passing vehicles, a chopper, a first input to said chopper electrically connected to said potentiometer arm, an output of said chopper, a servo motor mechanically connected to said potentiometer arm, means connecting the output of said chopper to said servo motor, divider means including a thermistor having an input connection to said storage means and an output connection to a second input of said chopper, a heater element adjacent said thermistor, means applying said direct current voltage output of said volume computer to said heater element whereby the ohmic value of said thermistor decreases as said direct current output of said volume computer increases whereby the voltage applied to said second input of said chopper decreases; and a density computer including a second potentiometer having a resistance element, an arm of said second potentiometer mechanically linked to said arm of the first mentioned potentiometer, a comparison means, means electrically connecting said direct current voltage to said comparison means, means electrically connecting the potential of said arm of said potentiometer to said comparison means, an alternating current amplifier whose input is controlled by said comparison means, an alternating current input to said alternating current amplifier, rectifying means receiving the output of said alternating current amplifier, and means applying the output of said rectifying means across potentiometer resistance element; and a comparison potentiometer, a voltage setting of said comparison potentiometer, a second comparison means, an electrical connection between said potentiometer and said second comparison means, an electrical input to said second comparison means proportional to the position of said arm of the first mentioned potentiometer, a second alternating current input to said amplifier controlled by said second comparison means whereby said second alternating current input is applied to said amplifier when the voltage which is proportional to the position of said arm of said first mentioned potentiometer is less than the voltage setting of the comparison potentiometer.

13. A device for determining the density of traffic on a roadway comprising: a volume computer including a vehicle detector, an impulse generating means for generating electrical impulses upon detection of a vehicle by said vehicle detector, means for converting the electrical impulses generated by said generating means to direct current voltage proportional to the number of vehicles detected by said vehicle detector in a unit time; a speed computer including means for obtaining a signal representative of the speed of a passing vehicle, storage means for storing a series of said speed signals, a potentiometer, an output shaft arm of said potentiometer whose position represents the speed of the passing vehicles, a chopper, an input to said chopper electrically connected with the potentiometer arm, a divider, circuit means electrically connected with said storage means for applying signals within said storage means to said divider, a second input to said chopper electrically connected with the output of said divider, a servo motor, an output of said chopper electrically connected to said servo motor, a mechanical linkage linking said servo motor and said potentiometer arm, divider altering means actuated by said direct current output of said volume computer, said altering means being constructed and arranged to decrease the voltage applied by said divider to said chopper upon increase of said direct current output of said volume computer; a density computer including a second potentiometer having a resistance element, an arm of said second potentiometer mechanically linked to said output shaft, a density direct current voltage on the remaining side of said second potentiometer resistance element, voltage comparison means, means electrically connecting the potential of said latter arm to said comparison means, means electrically connecting said direct current voltage to said comparison means, and means controlled by said comparison means for altering said density direct current voltage in accordance with a comparison voltage in accordance with a comparison made by said comparison means; and a comparison potentiometer, a voltage setting of said comparison potentiometer, a second comparison means, an electrical connection between said comparison potentiometer and said second comparison means, an electrical input to said second comparison means proportional to the position of said output shaft, a second input to said altering means controlled by said second comparison means whereby said second input is applied to said altering means when the voltage which is proportional to the position of the output shaft is less than the voltage setting of the comparison potentiometer.

14. A device for determining the density of traffic on a roadway comprising: a volume computer including a vehicle detector, an impulse generating means for generating electrical impulses upon detection of a vehicle by said vehicle detector, means for converting the electrical impulses generated by said generating means to a direct current voltage output proportional to the number of vehicles detected by said vehicle detector in a unit time; a speed computer including means for obtaining a signal representative of the speed of a passing vehicle, a storage means for storing a series of said speed signals, a potentiometer, an arm of said potentiometer whose position represents average speed of the passing vehicles, a comparing means, means electrically connecting said potentiometer arm to said comparing means, variable resistance means, means electrically connecting said storage means to the input of said variable resistance means, means electrically connecting the output of said variable resistance means to said comparing means, a servo motor mechanically connected to said potentiometer arm and driven by the output of said comparing means for positioning said potentiometer arm in accordance with the output of said comparing means, and a servo motor controlled by said volume computer voltage output for adjusting said variable resistance so that the input to the comparing means from said storage means is for a series of said speed signals developed by the vehicles sensed by said impulse generating means in said volume computer; and a density computer including a second potentiometer having a resistance element, an arm of said second potentiometer mechanically linked to the arm of the first mentioned potentiometer, a density direct current voltage applied across said potentiometer resistance element, voltage comparison means, means electrically connecting the potential of said arm of said second potentiometer to said comparison means, means electrically connecting said direct current output to said comparison means, and means controlled by said comparison means for altering said density direct current voltage in accordance with a comparison made by said comparison means.

15. A device for determining the density of traffic vehicles on a roadway comprising: a volume computer including a vehicle detector, an impulse generating means for generating electrical impulses upon detection of a vehicle by said vehicle detector, means for converting the electrical impulses generated by said generating means to direct current voltage proportional to the number of vehicles detected by said vehicle detector in a unit time; a speed computer including means for obtaining a signal representative of the speed of passing vehicles, a mechanical output shaft of said speed computer and means for positioning said output shaft in accordance with the said speed signal; and a density computer including a servo motor, a potentiometer arm driven by said servo motor, a second potentiometer, an electrical connection from said potentiometer arm to one side of said second potentiometer, the remaining side of said second potentiometer being grounded, means mechanically connecting the arm of said second potentiometer to the mechanical output of said speed computer for positioning said second arm proportionate to the mechanical output of said speed computer, a chopper, a first input to said chopper, means electrically connecting said second arm to said first input of said chopper, a second input of said chopper, means connecting the direct current output of said volume computer to said second input of said chopper, an output of said chopper, and means electrically connecting the output of said chopper to said servo motor to drive said first arm.

16. A traffic density computer including in combination a traffic volume computer providing an output representing traffic volume for vehicles passing a given point along a roadway, a traffic speed computer providing an output representing the average speed for substantially the same vehicles and a dividing device for dividing said volume output by said speed output to provide an output representing traffic density.

17. A traffic density computer for vehicles passing a point along a roadway, including means for sensing such vehicles and developing an output signal representative of the volume of such traffic in vehicles per unit time, means for sensing such vehicles and developing an output signal representative of the average speed of substantially the same such traffic in distance along the road per unit time, and means for dividing the traffic volume output signal by the traffic speed output signal to provide a resulting output signal representative of traffic density in vehicles per unit distance along the roadway.

18. A computer for determining the traffic density for vehicles passing a point in a traffic lane over a period of time, including means for producing an electrical output value representative of the average number of such vehicles passing per unit time over said time period, means for producing a second electrical output value representative of the average speed of such vehicles, and means for producing a third electrical output value from the ratio of the first and second said output values, said third electrical value being representative of the density of such traffic in vehicles per unit distance along said traffic lane.

19. A traffic density computer as in claim 18 and including means for varying said third electrical value inversely from said second electrical value when said second electrical value is less than a preset value concurrently with said third electrical value being less than the inverse of said second electrical value.

20. A traffic density computer as in claim 18 and including a meter controlled by said third electrical value and calibrated in vehicles per unit distance.

21. A computer as in claim 18 and including means for providing a further output in response to said third electrical value exceeding a predetermined value.

22. A computer for determining the traffic density of vehicles passing a point along a traffic lane including means for sensing such passing vehicles and producing an electrical output substantially proportional to the number of vehicles passing per unit time and representative of traffic volume, means for sensing such passing vehicles and producing a second electrical output substantially proportional to the average speed of the passing vehicles in distance along the traffic lane per unit time, means for correlating said second output producing means with the first output producing means to produce their respective outputs on a common base of substantially the same vehicles, and means for determining the ratio of said first output to said second output to provide a third output substantially proportional to the number of vehicles per unit distance along the roadway to represent the traffic density.

23. In a system for sensing the speed and passage of vehicles passing a point along a traffic lane and having a volume computer for providing an output signal substantially continuously proportional to the number of vehicles passing per unit time, and a speed average computer for providing a second output signal substantially continuously proportional to the average speed of the latest predetermined number of such vehicles passing, the combination of means for adjusting one of said computers from the other substantially continuously to conform the respective output signals to a common base of substantially the same sensed vehicles, and means for determining the ratio of the first output signal to the second output signal to provide a further output signal substantially proportional to such ratio and representing the density of traffic in vehicles per unit distance along said traffic lane.

24. In combination, a traffic volume computer providing an output representing the number of vehicles passing a given point along a roadway per unit of time, means for computing a running average speed of a predetermined number of such vehicles and providing an output representing such average speed, and means for adjusting said number of predetermined vehicles so averaged in accordance with the first mentioned output whereby the number of vehicles over which the speed is averaged will vary directly with the traffic volume.

25. Traffic apparatus comprising a traffic speed averaging computer, and means for computing traffic volume over a sampling time base which varies inversely with the average speed of the speed averaging computer so that traffic volume for a constant distance along the roadway is being measured.

26. Traffic apparatus as in claim 25 in which the volume computer and speed computer each derive an output signal and the apparatus further includes means for dividing the volume output by the speed output to derive an output representing traffic density over said constant distance.

27. Traffic density determining apparatus comprising a volume computer for computing traffic volume over a given sampling time base, a vehicle speed averaging computer for providing an output representative of substantially the same vehicles whose volume is being computed, means commonly connected between the volume and speed averaging computer for varying the time base of the volume computer and providing a corresponding change in the speed averaging circuit so that a common base of volume and speed exists even for changes in the sampling time base, and means for providing an output representative of the ratio of the volume and speed measurements.

28. Traffic density determining apparatus comprising a variable time base traffic volume computer for providing an output representative of volume of vehicles passing a point along a roadway over a sampling time base, a traffic speed averaging computer for averaging the speed of the vehicles within the same sampling base, means for varying the sampling time base inversely with the average speed of the vehicles within the sample so that the sampling base includes vehicles within a fixed distance along the roadway; means for selecting one of several time bases, within which said last means may provide variation, and for providing a corresponding selection in said speed averaging circuit to thereby retain a common base for the speed and volume circuits and means providing an output traffic density signal in proportion to the ratio of the volume and speed signals so that a density output will represent vehicles over a selectable fixed distance.

29. The combination as in claim 28 which further includes means for varying the speed averaging circuit in response to the output of the volume computer so that the effect of a single vehicle on the speed averaging computer will depend upon the number of vehicles in the same distance.

30. A combination as in claim 28 which further includes means for varying the speed averaging circuit in response to the density output so that the effect of a single vehicle on the speed averaging circuit will be controlled by the output density over the fixed sampling distance of roadway.

References Cited by the Examiner

UNITED STATES PATENTS

| | | | |
|---|---|---|---|
| 2,850,236 | 9/1958 | Schaefer | 235—196 |
| 2,874,367 | 2/1959 | De Palma | 340—31 |
| 2,908,891 | 10/1959 | Cass | 340—31 |
| 2,933,716 | 4/1960 | Soderberg | 340—31 X |
| 2,978,180 | 4/1961 | Annenberg | 235—196 |
| 3,024,443 | 3/1962 | Baker et al. | 340—31 |
| 3,047,838 | 7/1962 | Hendricks | 340—31 |

ROBERT C. BAILEY, *Primary Examiner.*

BENNETT G. MILLER, MALCOLM A. MORRISON, *Examiners.*